(12) United States Patent
Nomura

(10) Patent No.: US 11,816,292 B2
(45) Date of Patent: Nov. 14, 2023

(54) PEN STATE DETECTION CIRCUIT AND PEN STATE DETECTION METHOD

(71) Applicant: Wacom Co., Ltd., Saitama (JP)

(72) Inventor: Yoshio Nomura, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/558,344

(22) Filed: Dec. 21, 2021

(65) Prior Publication Data

US 2022/0113856 A1 Apr. 14, 2022

Related U.S. Application Data

(63) Continuation of application No. 16/849,539, filed on Apr. 15, 2020, now Pat. No. 11,209,938.

(30) Foreign Application Priority Data

Apr. 22, 2019 (JP) ................. 2019-081357

(51) Int. Cl.
*G06F 3/03* (2006.01)
*G06F 3/041* (2006.01)
(Continued)

(52) U.S. Cl.
CPC .......... *G06F 3/04186* (2019.05); *G06F 3/038* (2013.01); *G06F 3/044* (2013.01); *G06F 2203/04106* (2013.01)

(58) Field of Classification Search
CPC ...... G06F 3/04186; G06F 3/038; G06F 3/044; G06F 2203/04106; G06F 2203/04102;
(Continued)

(56) References Cited

U.S. PATENT DOCUMENTS

2005/0057535 A1* 3/2005 Liu .................. G06T 11/203
345/179
2014/0078105 A1 3/2014 Son
(Continued)

FOREIGN PATENT DOCUMENTS

JP 2015079281 A 4/2015
JP 2015-87785 A 5/2015

*Primary Examiner* — Lunyi Lao
*Assistant Examiner* — Jarurat Suteerawongsa
(74) *Attorney, Agent, or Firm* — Seed IP Law Group LLP

(57) ABSTRACT

A pen state detection circuit that is connected to a touch sensor of a capacitance type and adapted to detect a state of an electronic pen in accordance with an output signal from the touch sensor. The touch sensor includes sensor electrodes disposed in a planar manner, and the electronic pen includes a first electrode and a second electrode. The pen state detection circuit includes a processor configured to sequentially and repeatedly: acquire first and second coordinate values in a sensor coordinate system, the coordinate system being defined on a detection surface of the touch sensor, the first coordinate values indicating a projected position of the first electrode, the second coordinate values indicating a projected position of the second electrode; calculate an inclination value indicative of an inclination of the electronic pen from the acquired first and second coordinate values in accordance with calculation rules; and output the inclination value.

4 Claims, 25 Drawing Sheets

(51) Int. Cl.
  *G06F 3/038*    (2013.01)
  *G06F 3/044*    (2006.01)
(58) Field of Classification Search
  CPC .... G06F 3/04162; G06F 3/03545; G06F 3/04; G06F 3/03
  See application file for complete search history.

(56) References Cited

U.S. PATENT DOCUMENTS

| | | |
|---|---|---|
| 2014/0204038 A1 | 7/2014 | Ohba et al. |
| 2015/0070315 A1 | 3/2015 | Oda et al. |
| 2015/0116279 A1 | 4/2015 | Ohba et al. |
| 2016/0313966 A1 | 10/2016 | Jeong et al. |
| 2020/0387240 A1* | 12/2020 | Munakata ............. G06F 3/0304 |

* cited by examiner

FIG.8

| CONDITION NAME | DECISION CONDITIONS | INCLINATION VALUE CALCULATION METHOD |
|---|---|---|
| FIRST CONDITIONS A | (1) FIRST POSITION IS AT GENERAL SECTION<br>(2) SECOND POSITION IS AT PERIPHERY | WEIGHTED SUM OBTAINED BY ADDING PREVIOUS INCLINATION VALUE (COEFFICIENT: SMALL) |
| FIRST CONDITIONS B | (1) FIRST POSITION HAS MOVED OUTWARD FROM INSIDE OF TOUCH SENSOR<br>(2) SECOND POSITION IS AT PERIPHERY | WEIGHTED SUM OBTAINED BY ADDING PREVIOUS INCLINATION VALUE (COEFFICIENT: GREAT) |
| SECOND CONDITIONS | (1) FIRST POSITION IS DETECTABLE<br>(2) SECOND POSITION IS UNDETECTABLE | LATEST VALID VALUE |
| THIRD CONDITION | FIRST OR SECOND POSITION IS AT SPECIFIC PERIPHERY | WEIGHTED SUM OBTAINED BY ADDING PREVIOUS INCLINATION VALUE (COEFFICIENT: SMALL) |
| FOURTH CONDITIONS A | (1) FIRST OR SECOND POSITION IS AT BEND<br>(2) BEND FORMS PROTRUDED DETECTION SURFACE | INCLINATION VALUE = ZERO |
| FOURTH CONDITIONS B | (1) FIRST OR SECOND POSITION IS AT BEND<br>(2) BEND FORMS RECESSED DETECTION SURFACE | WEIGHTED SUM OBTAINED BY ADDING PREVIOUS INCLINATION VALUE (COEFFICIENT: GREAT) |

PEN STATE DETECTION CIRCUIT AND PEN STATE DETECTION METHOD

BACKGROUND

Technical Field

The present disclosure relates to a pen state detection circuit and a pen state detection method.

Background Art

An electronic device disclosed in Japanese Patent Laid-open No. 2015-087785 detects a first position, which is a position on a detection surface of a touch sensor that is touched by a hand of a user, detects a second position, which is a position indicated by an electronic pen, estimates a direction of inclination of the electronic pen by using coordinate values of the first and second positions, and corrects the position indicated by the electronic pen in accordance with the estimated direction of inclination.

Incidentally, even in a case where the hand of the user is not in contact with the detection surface, a position and a posture of the electronic pen can be estimated by using an electronic pen having two electrodes. However, the two electrodes are disposed at a physical distance from each other. Therefore, there are some cases where, for example, at a periphery or a bend of the touch sensor, only a projected position of one electrode is not detected or a detected projected position is deviated from an actual projected position. Consequently, unexpected calculation results regarding the state of the electronic pen are outputted.

BRIEF SUMMARY

The present disclosure has been made in view of the above circumstances, and provides a pen state detection circuit and a pen state detection method that make it possible to inhibit unexpected results from being obtained from a periphery or a bend of a touch sensor when the inclination of an electronic pen having two electrodes is calculated.

According to a first aspect of the present disclosure, there is provided a pen state detection circuit that is connected to a touch sensor of a capacitance type and adapted to detect a state of an electronic pen in accordance with an output signal from the touch sensor, the touch sensor including a plurality of sensor electrodes disposed in a planar manner, the electronic pen including a first electrode and a second electrode, the pen state detection circuit including: a processor; and a memory storing instructions that, when executed by the processor, cause the pen state detection circuit to sequentially and repeatedly: acquire first coordinate values and second coordinate values in a sensor coordinate system, the coordinate system being defined on a detection surface of the touch sensor, the first coordinate values indicating a projected position of the first electrode, the second coordinate values indicating a projected position of the second electrode; calculate an inclination value indicative of an inclination of the electronic pen from the first coordinate values and second coordinate values in accordance with calculation rules; and output the inclination value, in which, while the inclination value is sequentially and repeatedly calculated and outputted, an inclination value outputted when decision conditions are satisfied is different from an inclination value calculated in accordance with ordinary calculation rules when the decision conditions are not satisfied, the decision conditions representing a situation where at least one of the first and second electrodes is potentially in a position interfering with a periphery or a bend of the touch sensor as viewed from above the detection surface.

According to a second aspect of the present disclosure, there is provided a pen state detection method performed by a pen state detection circuit, the pen state detection circuit being connected to a touch sensor of a capacitance type and adapted to detect a state of an electronic pen in accordance with an output signal from the touch sensor, the touch sensor including a plurality of sensor electrodes disposed in a planar manner, the electronic pen including a first electrode and a second electrode, the method including sequentially and repeatedly: acquiring first coordinate values and second coordinate values in a sensor coordinate system, the coordinate system being defined on a detection surface of the touch sensor, the first coordinate values indicating a projected position of the first electrode, the second coordinate values indicating a projected position of the second electrode; calculating an inclination value indicative of an inclination of the electronic pen from the first coordinate values and second coordinate values in accordance with calculation rules; and outputting the inclination value, in the calculating and outputting, an inclination value outputted when decision conditions are satisfied being different from an inclination value that is calculated in accordance with ordinary calculation rules when the decision conditions are not satisfied, the decision conditions representing a situation where at least one of the first and second electrodes is potentially in a position interfering with a periphery or a bend of the touch sensor as viewed from above the detection surface.

According to a third aspect of the present disclosure, there is provided a pen state detection circuit that is connected to a touch sensor of a capacitance type and adapted to detect a state of an electronic pen in accordance with an output signal from the touch sensor, the touch sensor including a plurality of sensor electrodes disposed in a planar manner, the electronic pen including a first electrode and a second electrode, the pen state detection circuit including: a processor; and a memory storing instructions that, when executed by the processor, cause the pen state detection circuit to sequentially and repeatedly: acquire first coordinate values and second coordinate values in a sensor coordinate system, the coordinate system being defined on a detection surface of the touch sensor, the first coordinate values indicating a projected position of the first electrode, the second coordinate values indicating a projected position of the second electrode; calculate an inclination value indicative of an inclination of the electronic pen from the first coordinate values and second coordinate values in accordance with calculation rules, and output the inclination value, wherein time-series inclination values sequentially outputted when the electronic pen is positioned at a periphery of the touch sensor during the movement of the electronic pen are smoothed to a greater extent than time-series inclination values sequentially outputted when the electronic pen is positioned at a central portion of the touch sensor.

According to a fourth aspect of the present disclosure, there is provided a pen state detection circuit that is connected to a touch sensor of a capacitance type and adapted to detect a state of an electronic pen in accordance with an output signal from the touch sensor, the touch sensor including a plurality of sensor electrodes disposed in a planar manner, the electronic pen including a first electrode and a second electrode, the pen state detection circuit including: a processor; and a memory storing instructions that, when executed by the processor, cause the pen state detection circuit to sequentially and repeatedly: acquire first coordinate values and second coordinate values in a sensor coordinate system, the coordinate system being defined on a detection surface of the touch sensor, the first coordinate values indicating a projected position of the first electrode, the second coordinate values indicating a projected position of the second electrode; calculate an inclination value indicative of an inclination of the electronic pen from the first coordinate values and second coordinate values in accordance with calculation rules; and output the inclination value, wherein time-series inclination values sequentially outputted when the electronic pen is positioned at a bend of the touch sensor during the movement of the electronic pen are more smoothed than time-series inclination values sequentially outputted when the electronic pen is positioned at a flat portion of the touch sensor.

One or more aspects of the present disclosure make it possible to inhibit unexpected results from being obtained from a periphery or a bend of a touch sensor when the inclination of an electronic pen having two electrodes is calculated.

BRIEF DESCRIPTION OF THE DRAWINGS

FIG. 8 is a diagram illustrating exemplary combinations of decision conditions and calculation methods;

DETAILED DESCRIPTION

A pen state detection circuit and a pen state detection method, which are provided by the present disclosure, will now be described with reference to the accompanying drawings. The present disclosure is not limited to embodiments and modifications described below. It is obvious that the embodiments and modifications described below may be freely changed without departing from the spirit and scope of the present disclosure. Alternatively, various configurations may be combined as appropriate without causing technical inconsistencies.

First Embodiment

A pen state detection circuit and a pen state detection method according to a first embodiment of the present disclosure are described below with reference to FIGS. 1 to 10B.

<Overall Configuration of Input System 10>

Figure 1:
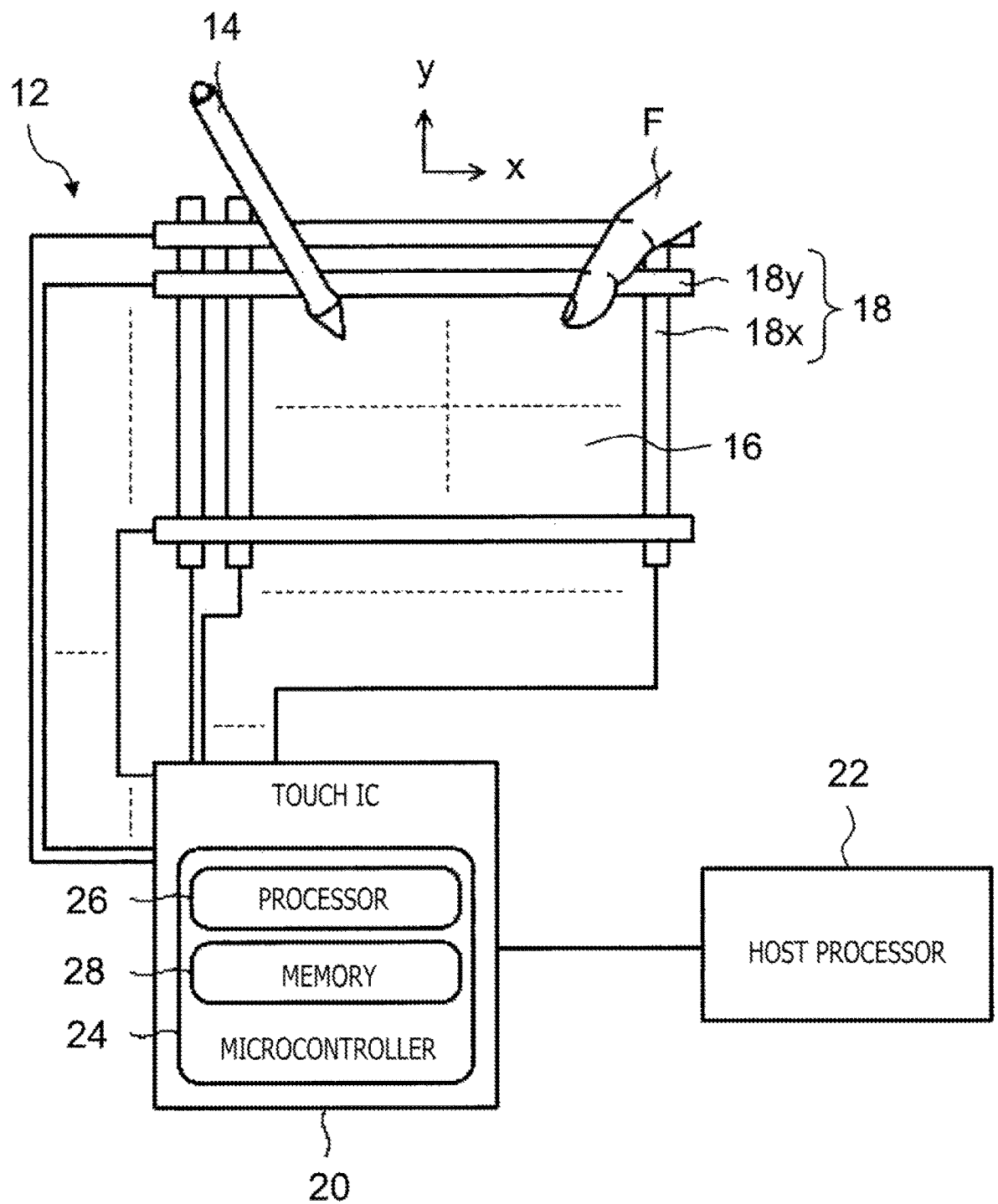
FIG. 1 is a diagram illustrating an example of an input system incorporating a pen state detection circuit according to a first embodiment of the present disclosure.

FIG. 1 is a diagram illustrating an example of an input system 10 incorporating the pen state detection circuit according to the first embodiment of the present disclosure. The input system 10 includes an electronic device 12 and an electronic pen 14 (referred to also as a "stylus"). The electronic device 12 has a touch panel display. The electronic pen 14 is a pen-shaped pointing device.

The electronic device 12 is formed, for example, of a tablet terminal, a smartphone, or a personal computer. A user holding the electronic pen 14 with one hand is able to write pictures and characters on the electronic device 12 by pressing a tip of the electronic pen 14 on a detection surface 16 of the electronic device 12 and moving the tip of the electronic pen 14 as desired. Further, the user is able to perform a desired operation through a displayed user control by placing a finger F of the user into contact with the detection surface 16.

The electronic device 12 includes a touch sensor 18, a touch integrated circuit (IC) 20, and a host processor 22. The touch IC 20 functions as the pen state detection circuit. The touch sensor 18 is formed by combining a plurality of electrodes disposed on a display panel (not depicted). The touch sensor 18 includes a plurality of sensor electrodes $18x$ for detecting a position on an X-axis and a plurality of sensor electrodes $18y$ for detecting a position on a Y-axis. The x-direction and the y-direction depicted in FIG. 1 respectively correspond to the X-axis and the Y-axis of an orthogonal coordinate system defined on the detection surface 16 formed by the touch sensor 18.

The sensor electrodes $18x$, which are each shaped like a belt and extended in the y-direction, are disposed at equal intervals in the x-direction. The sensor electrodes $18y$, which are each shaped like a belt and extended in the x-direction, are disposed at equal intervals in the y-direction. The intervals at which the sensor electrodes 18$x$ (or the sensor electrodes 18$y$) are disposed may be hereinafter expressed by using the word "pitch." As a substitute for a mutual-capacitive sensor described above, a self-capacitive sensor formed of block-shaped electrodes disposed in a two-dimensional grid pattern may be used as the touch sensor 18.

The touch IC 20 is an integrated circuit that includes a microcontroller 24 having a processor 26 and a memory 28, wherein the processor 24 capable of executing firmware (e.g., instructions) stored in the memory 24, and is connected to the sensor electrodes 18$x$ and 18$y$ included in the touch sensor 18. The microcontroller 24 is capable of implementing a touch detection function and a pen detection function. The microcontroller 24 performing the touch detection function detects a touch, for example, by the finger F of the user. The microcontroller 24 performing the pen detection function detects the state of the electronic pen 14.

The touch detection function includes, for example, a function for scanning the touch sensor 18, a function for creating a heat map (two-dimensional distribution of detection levels) on the touch sensor 18, and a function for classifying regions on the heat map (e.g., classification of fingers F and palms of hands). The pen detection function includes, for example, a function for scanning the touch sensor 18 (global scan or sector scan), a function for receiving and analyzing a downlink signal, a function for estimating a state of the electronic pen 14 (e.g., position, inclination, and pen pressure), and a function for generating and transmitting an uplink signal including a command for the electronic pen 14.

The host processor 22 includes a central processing unit (CPU) or a graphics processing unit (GPU). The host processor 22 reads a program from a memory (not depicted) and executes the read program to thereby perform a process of generating digital ink by using data from the touch IC 20 and a rendering process for displaying a drawing indicated by the digital ink, for example.

<Pen State Estimation Method>

Figure 2:
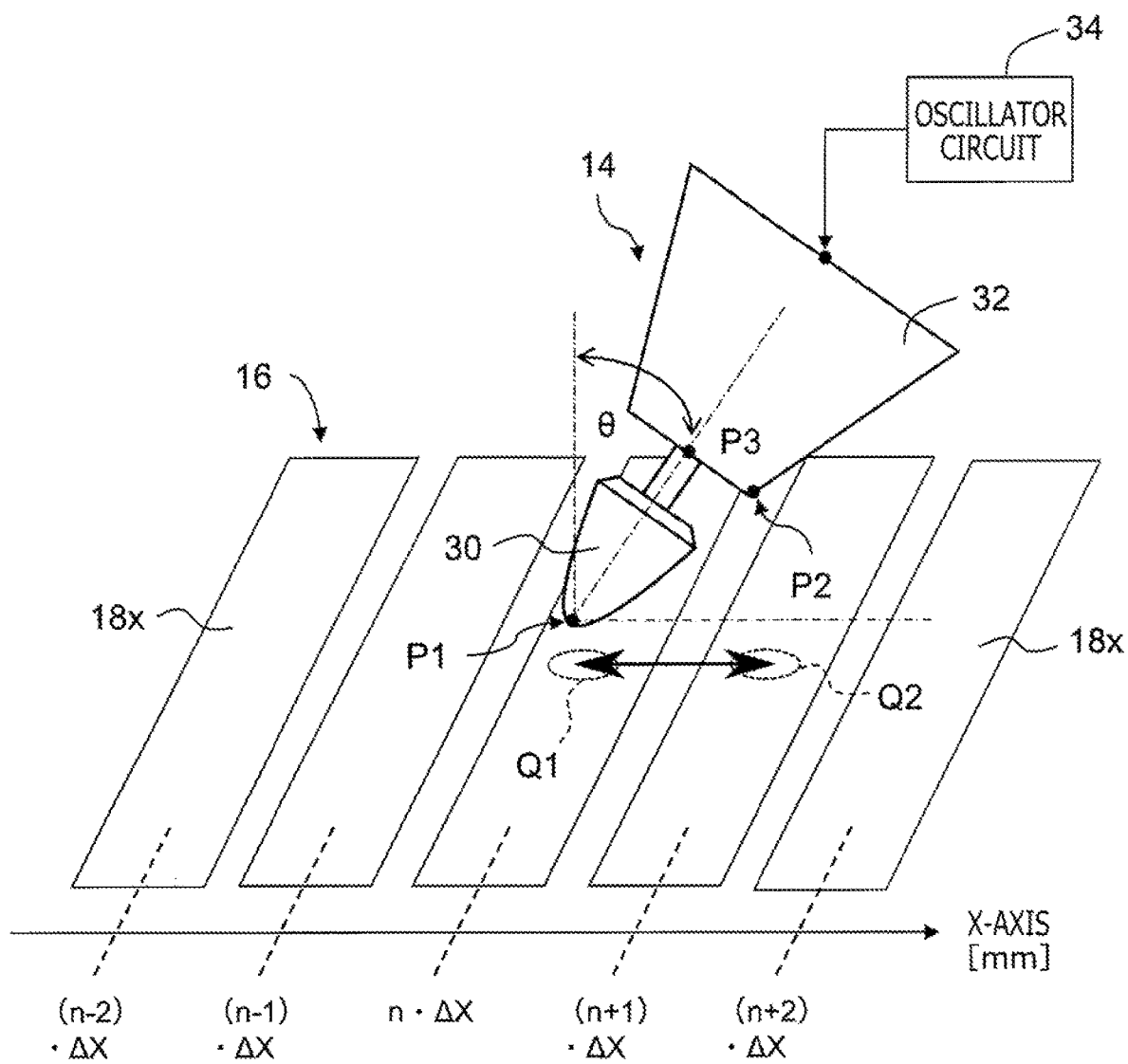
FIG. 2 is a schematic diagram illustrating a part of an electronic pen depicted in FIG. 1.

FIG. 2 is a schematic diagram illustrating a part of the electronic pen 14 depicted in FIG. 1. The electronic pen 14 includes a tip electrode 30 and an upper electrode 32. The tip electrode 30, which is conical in shape, is symmetrically shaped with respect to a central axis of the electronic pen 14 and disposed on the tip of the electronic pen 14. The upper electrode 32, which is tapered and annular (e.g., frustoconical) in shape, is symmetrically shaped with respect to the axis of the electronic pen 14 and disposed closer to a base end than the tip electrode 30.

The tip electrode 30 and the upper electrode 32 output signals (so-called downlink signals) generated by an oscillator circuit 34. As the oscillator circuit 34 changes an oscillation frequency or changes a destination in a time-division manner, the electronic pen 14 is able to output two different downlink signals through the tip electrode 30 and the upper electrode 32, respectively.

The touch IC 20 (FIG. 1) in the electronic device 12 acquires, from the touch sensor 18, a signal distribution (hereinafter referred to as a "first signal distribution") indicative of a change in capacitance (more specifically, mutual-capacitance or self-capacitance) that occurs when the tip electrode 30 is in proximity to the touch sensor 18. The first signal distribution is typically shaped to have one peak at a position Q1. The position Q1 corresponds to a position where an apex (position P1) of the tip electrode 30 is projected onto the detection surface 16.

Similarly, the touch IC 20 (FIG. 1) in the electronic device 12 acquires, from the touch sensor 18, a signal distribution (hereinafter referred to as a "second signal distribution") indicative of a change in capacitance that occurs when the upper electrode 32 is in proximity to the touch sensor 18. The second signal distribution is typically shaped to have one or two peaks at a position Q2. The position Q2 corresponds to a position where a shoulder (position P2) of the upper electrode 32 is projected onto the detection surface 16. A position P3, which will be described later, corresponds to a center of an upper base of the upper electrode 32.

Figure 3A:
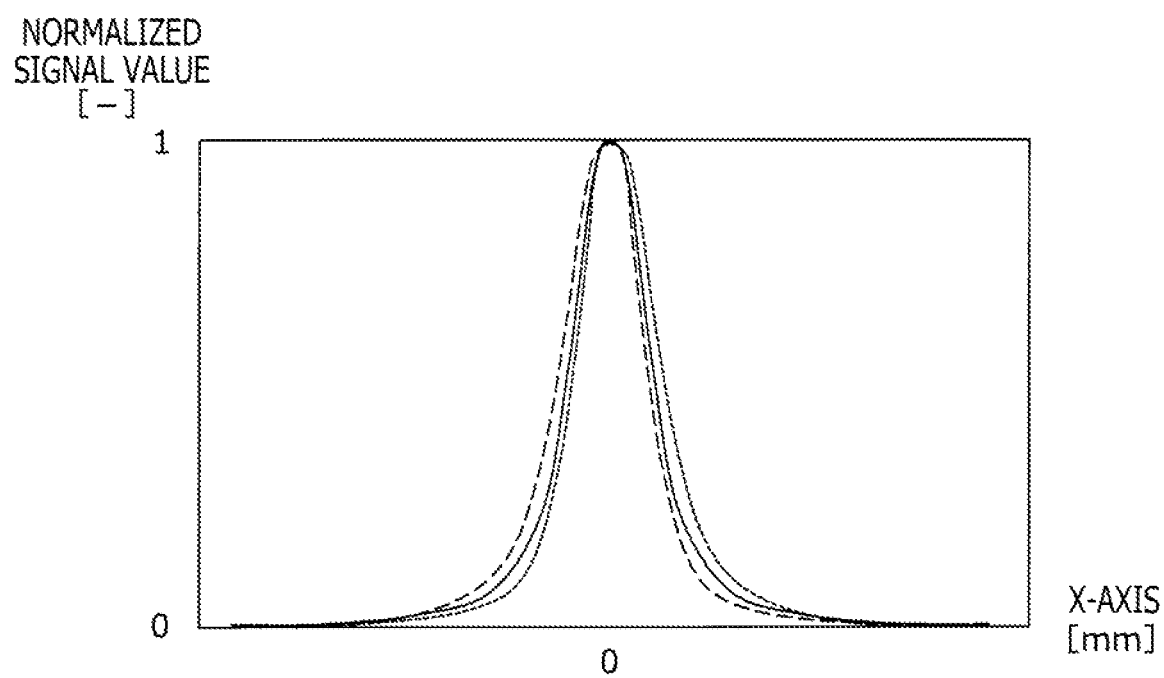
FIGS. 3A and 3B are diagrams illustrating examples of signal distributions that are obtained when the electronic pen is in a contact state.
Figure 3B:
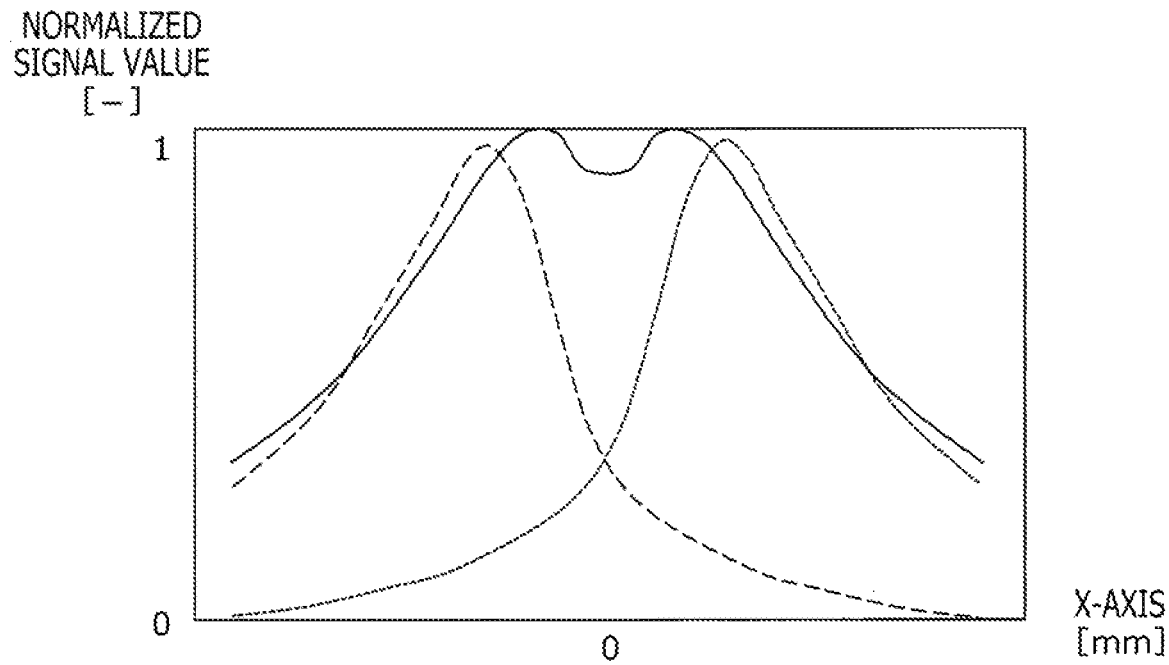

FIGS. 3A and 3B are diagrams illustrating examples of signal distributions that are obtained when the electronic pen 14 is in a contact state. More specifically, FIG. 3A illustrates the first signal distribution, and FIG. 3B illustrates the second signal distribution. In FIGS. 3A and 3B, the horizontal axis of each graph represents a relative position (unit: millimeters) with respect to an indicated position indicated by the electronic pen 14, and the vertical axis of each graph represents a signal value (unit: none) normalized to [0,1]. For the signal value, positive and negative signs are defined in such a manner that the signal value is "positive" when the electronic pen 14 is in proximity to the touch sensor 18. The first signal distribution and the second signal distribution both vary in shape depending on the inclination of the electronic pen 14 (hereinafter referred to also as "pen inclination"). In FIGS. 3A and 3B, three curves obtained by varying the pen inclination are depicted in an overlapping manner.

As depicted in FIG. 3A, the shapes of the first signal distribution are substantially similar to each other irrespective of the pen inclination. The reason is that, while the electronic pen 14 is used, the apex of the tip electrode 30 is usually closest to the detection surface 16 to make the position Q1 substantially coincide with the position P1. Meanwhile, as depicted in FIG. 3B, the second signal distribution is such that the position of a peak or the number of peaks significantly varies with changes in the pen inclination. The reason is that, while the electronic pen 14 is used, either one of the shoulders of the upper electrode 32 is usually closest to the detection surface 16 to make the distance between the positions Q1 and Q2 vary with the pen inclination.

The position and the posture of the electronic pen 14 can be estimated by using the coordinates of the positions Q1 and Q2. For example, the indicated position corresponds to the position Q1 depicted in FIG. 2. The pen inclination corresponds to an angle (hereinafter referred to as an "inclination angle $\theta$") between a direction that is perpendicular to the detection surface 16 and the axis of the electronic pen 14. More specifically, $\theta=0°$ in a state where the pen inclination is perpendicular to the detection surface 16, and $\theta=90°$ in a state where the pen inclination is parallel to the detection surface 16. As a physical quantity indicative of the inclination of the electronic pen 14, an orientation indicative of the "direction" of inclination may be used instead of an angle indicative of the "magnitude" of inclination.

Figure 4:
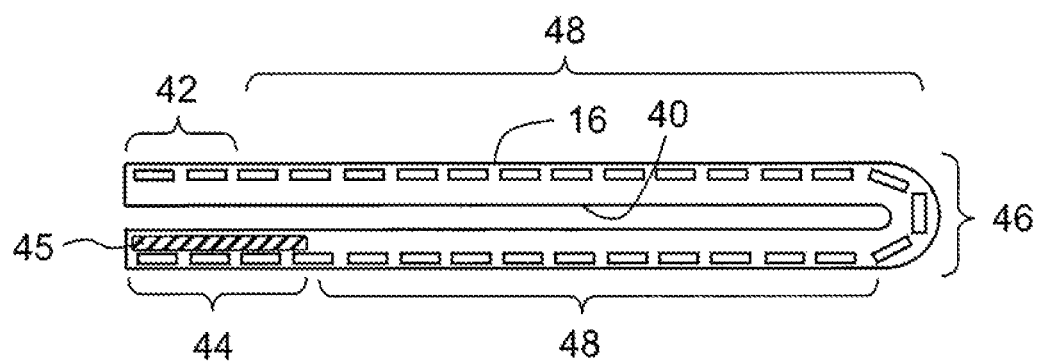
FIG. 4 is a schematic side cross-sectional view illustrating an electronic device depicted in FIG. 1.

FIG. 4 is a schematic side cross-sectional view illustrating the electronic device 12 depicted in FIG. 1. Linearly disposed rectangles schematically represent the sensor electrodes 18$x$ and 18$y$ (FIG. 1), which are arrayed in a planar manner. In the example of FIG. 4, the electronic device 12, which is flat, is folded into halves in such a manner that the detection surface 16 faces outwardly while a non-detection surface 40 faces inwardly. This enables the user to perform input operations by using the electronic pen 14 and the finger F even in a state where the electronic device 12 is folded.

As the tip electrode 30 and upper electrode 32 of the electronic pen 14 are disposed at a physical distance from each other, there may arise a situation where the positions Q1 and Q2 are not correctly detected depending on the relative positional relationship between the electronic pen 14 and the touch sensor 18. The situation may arise, for example, [1] when only the position Q2 is left undetected at a periphery 42, [2] when the accuracy of detection of the positions Q1 and Q2 is lowered due to electromagnetic wave interference caused at a periphery 44 by electronic parts 45 including a camera unit, and [3] when the position Q2 is occasionally left undetected at a bend 46.

Stated differently, a problem occurs so that unexpected calculation results regarding the state of the electronic pen 14 are outputted when the positions Q1 and Q2 are left undetected or when the detected positions Q1 and Q2 are deviated from actual projected positions. Therefore, a pen state detection method is proposed to address the above problem. The proposed pen state detection method inhibits unexpected calculation results from being obtained from the peripheries 42 and 44 or the bend 46 of the touch sensor 18 when the inclination of the electronic pen 14 including the tip electrode 30 and the upper electrode 32 is calculated.

<Operation of Touch IC 20>

Figure 5:
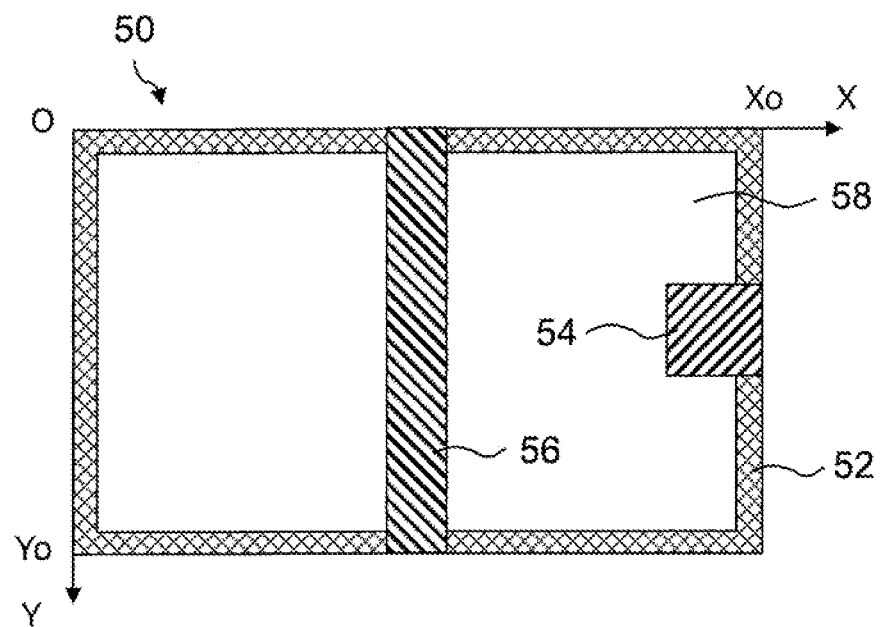
FIG. 5 is a diagram illustrating an exemplary diagram of a sensor region of a touch sensor.

FIG. 5 is a diagram illustrating an exemplary diagram of a sensor region 50 of the touch sensor 18. An adopted sensor coordinate system is a two-dimensional orthogonal coordinate system that has an origin O, an X-axis, and a Y-axis. The origin O is a feature point (e.g., upper left vertex) on the detection surface 16. An X-Y plane coincides with the planar direction of the detection surface 16. The sensor region 50 includes at least one of a peripheral region 52 corresponding to the periphery 42 (FIG. 4), a peripheral region 54 corresponding to the periphery 44 (FIG. 4), and a bend region 56 corresponding to the bend 46 (FIG. 4). The remaining portion of the sensor region 50 is a general region 58 that corresponds to a flat general section 48 depicted in FIG. 4. The shape of each region (e.g., width, position, and size) can be variously set depending on the electronic device 12 or the electronic pen 14.

Figure 6:
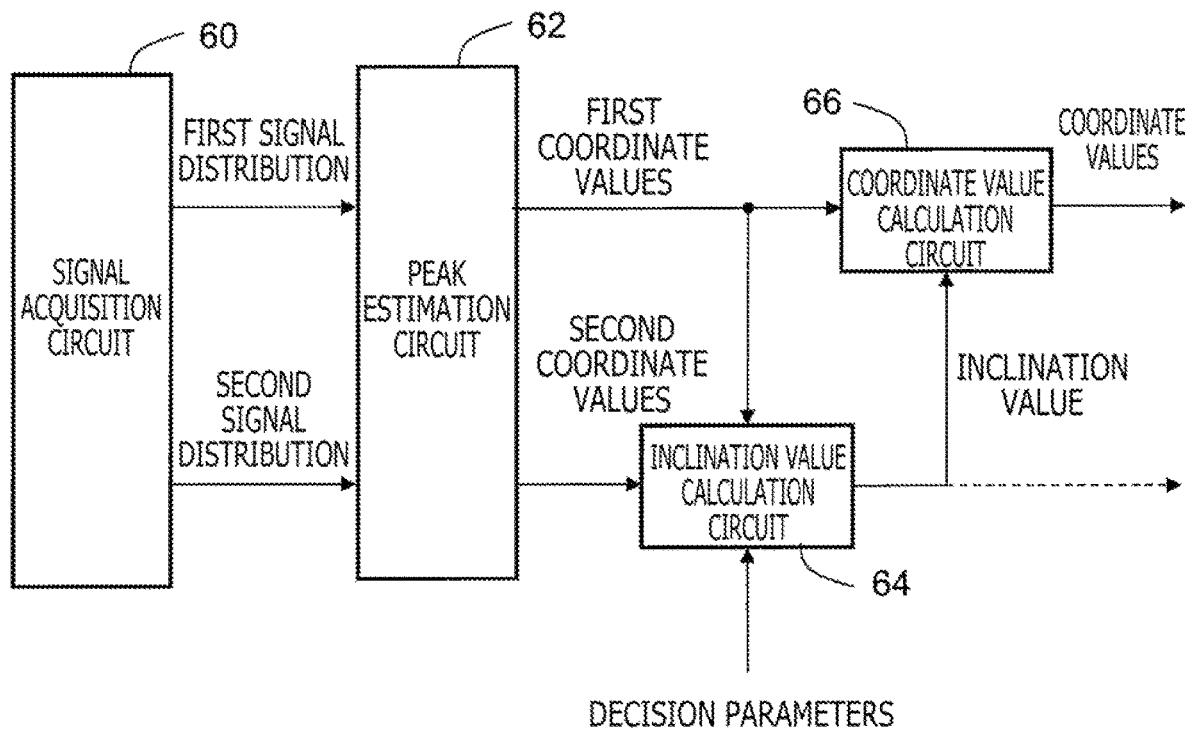
FIG. 6 is a block diagram illustrating a pen detection function of a touch IC depicted in FIG. 1.

FIG. 6 is a block diagram illustrating the pen detection function of the touch IC 20 depicted in FIG. 1. The pen detection function is implemented by a signal acquisition circuit 60, a peak estimation circuit 62, an inclination value calculation circuit 64, and a coordinate value calculation circuit 66. The functions of the signal acquisition circuit 60, peak estimation circuit 62, inclination value calculation circuit 64, coordinate value calculation circuit 66 may be performed by the processor 26 while processor 26 executes instructions stored in the memory 28. An operation performed by the touch IC 20 while the processor 26 executes instructions stored in the memory 28 to perform the pen detection function will now be described with reference to the flowchart of FIG. 7.

Figure 7:
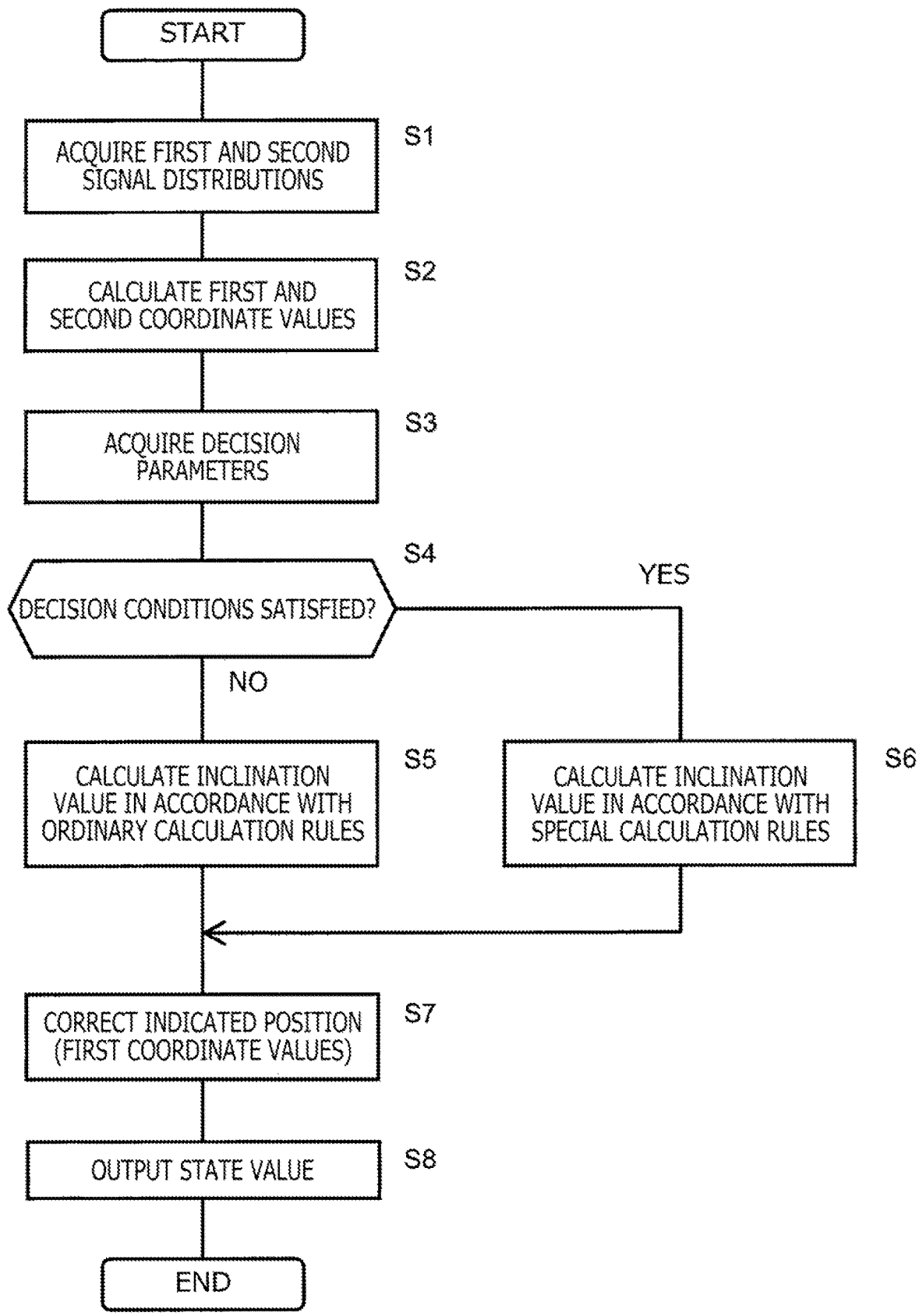
FIG. 7 is a flowchart illustrating execution of a pen detection function depicted in FIG. 4.

At S1 of FIG. 7, the signal acquisition circuit 60 acquires the first signal distribution and the second signal distribution from the touch sensor 18 through a scanning operation performed on each of the sensor electrodes 18x and 18y. Each of the signal distributions may be a one-dimensional signal distribution along the X- or Y-axis or a two-dimensional signal distribution on the X-Y axis plane.

At S2, the peak estimation circuit 62 estimates a peak of the first signal distribution acquired at S1. More specifically, the peak estimation circuit 62 creates a curve by performing interpolation or approximation of the first signal distribution, which is discrete, and calculates first coordinate values corresponding to a peak of the created curve. Similarly, the peak estimation circuit 62 creates a curve by performing interpolation or approximation of the second signal distribution, which is discrete, and calculates second coordinate values corresponding to a peak of the created curve. The "first coordinate values" indicate a projected position of the tip electrode 30 (hereinafter referred to as a "first position"), and the "second coordinate values" indicate a projected position of the upper electrode 32 (hereinafter referred to as a "second position").

At S3, the inclination value calculation circuit 64 acquires decision parameters necessary for later-described decision. The decision parameters may be, for example, parameters for identifying the position and the shape of the peripheral regions 52 and 54 or the bend region 56 (FIG. 5) or parameters for identifying the state of the electronic pen 14.

At S4, the inclination value calculation circuit 64 uses the first or second coordinate values acquired at S2 and the decision parameters acquired at S3 to determine whether or not predetermined decision conditions are satisfied. The "decision conditions" represent a situation where at least one of the tip electrode 30 and the upper electrode 32 is potentially in a position interfering with the peripheries 42 and 44 or the bend 46 as viewed from above the detection surface 16.

FIG. 8 is a diagram illustrating exemplary combinations of decision conditions and calculation methods. "First conditions A" represent a situation where (1) the first position is at the general section 48 and (2) the second position is at the periphery 42. In other words, it is determined that the first conditions A are satisfied when (1) the first coordinate values indicate a position in the general region 58 and (2) the second coordinate values indicate a position in the peripheral region 52.

"First conditions B" represent a situation where (1) the first position has moved outwardly from the inside of the touch sensor 18 and (2) the second position is at the periphery 42. In other words, it is decided that the first conditions B are satisfied when (1) the first coordinate values indicate an outward movement from the inside of the sensor region 50 and (2) the second coordinate values indicate a position in the peripheral region 52.

"Second conditions" represent a situation where (1) the first position is detected and (2) the second position is not detected. In other words, it is decided that the second conditions are satisfied when (1) the first coordinate values can be acquired and (2) the second coordinate values cannot be acquired.

A "third condition" represents a situation where the first position or the second position is at a specific periphery 44. In other words, it is decided that the third condition is satisfied when at least one of a pair of the first coordinate values and a pair of the second coordinate values indicates a position in the peripheral region 54.

"Fourth conditions A" represent a situation where (1) the first or second position is at the bend 46 and (2) the bend 46 forms a protruded detection surface 16. In other words, it is decided that the fourth conditions A are satisfied when (1) at least one of a pair of the first coordinate values and a pair of the second coordinate values indicates a position in the bend region 56 and (2) a flag value regarding the bend direction of the bend region 56 indicates an "upward protrusion."

"Fourth conditions B" represent a situation where (1) the first or second position is at the bend 46 and (2) the bend 46 forms a recessed detection surface 16. In other words, it is decided that the fourth conditions B are satisfied when (1) at least one of a pair of the first coordinate values and a pair of the second coordinate values indicates a position in the bend region 56 and (2) the flag value regarding the bend direction of the bend region 56 indicates a "downward protrusion."

For decision purposes, the inclination value calculation circuit 64 may define and use additional conditions representing "a situation where the electronic pen 14 is in a contact state" in addition to the plurality of sets of above-mentioned decision conditions. The "contact state" is a state where the tip electrode 30 of the electronic pen 14 is in contact with the detection surface 16 of the electronic device 12. Conversely, a "hover state" is a state where the tip electrode 30 of the electronic pen 14 is not in contact with the detection surface 16 of the electronic device 12. In a case where, for example, the electronic pen 14 includes a pen pressure sensor 38 (FIG. 14), the touch IC 20 is able to identify the above-mentioned two states by analyzing a downlink signal transmitted from the electronic pen 14.

If none of the plurality of sets of predetermined decision conditions is satisfied ("NO" at S4), processing proceeds to S5. Meanwhile, if one of the plurality of sets of predetermined decision conditions is satisfied ("YES" at S4), processing proceeds to S6.

At S5, the inclination value calculation circuit 64 calculates an inclination value (hereinafter referred to as "ordinary calculated value") indicative of current pen inclination in accordance with ordinary calculation rules, which use the first and second coordinate values currently acquired at S2. The "ordinary calculation rules" are rules for calculating the inclination value based on a geometric model that is established on an assumption that the detection surface 16 is flat. More specifically, in a case where the distance between the positions P1 and P3 is H and the distance between the positions Q1 and Q2 is D, the inclination value calculation circuit 64 calculates an inclination angle θ in accordance with Equation (1) below, where DO is the distance between the positions Q1 and Q2 when θ=0 [degree].

$$\theta = \sin^{-1}(D/H) - \sin^{-1}(D0/H) \quad (1)$$

Meanwhile, at S6, the inclination value calculation circuit 64 calculates the inclination value in accordance with calculation rules (hereinafter referred to as "special calculation rules") different from the ordinary calculation rules used at S5. In other words, the inclination value calculation circuit 64 calculates a value different from the "ordinary calculated value," which is calculated from the currently acquired first and second coordinate values in accordance with the ordinary calculation rules.

If the first conditions A, the first conditions B, the third condition, or the fourth conditions B in FIG. 8 are satisfied, the inclination value calculation circuit 64 obtains the ordinary calculated value in a similar manner as at S5, and then corrects the obtained ordinary calculated value. More specifically, the inclination value calculation circuit 64 outputs a weighted sum of a currently calculated inclination value and one or more previously calculated inclination values (e.g., calculated at the nth last time point; n is a natural number).

If, for example, the inclination angle indicated by the last outputted inclination value (hereinafter referred to as a "last inclination value") is θprv, and the indication angle indicated by the ordinary calculated value is θcal, the inclination value calculation circuit 64 calculates the inclination angle θ in accordance with Equation (2) below.

$$\theta = (1-\alpha) \times \theta cal + \alpha \times \theta prv \quad (2)$$

A coefficient α in the above equation is a positive value satisfying 0<α<1, and corresponds to a parameter representing the level of smoothing. In other words, the greater the value of the coefficient α is, the higher the level of smoothing is, whereas the smaller the value of the coefficient α is, the lower the level of smoothing is.

If the second conditions are satisfied, the inclination value calculation circuit 64 outputs an inclination value that is obtained earlier than the current inclination value. More specifically, if θprv is the latest valid value, the inclination value calculation circuit 64 calculates the inclination angle θ in such a manner that θ=θprv. This equation coincides with Equation (2) if α=1.

If the fourth conditions B are satisfied, the inclination value calculation circuit 64 outputs an inclination value indicating that the electronic pen 14 is perpendicular to the detection surface 16. More specifically, the inclination value calculation circuit 64 calculates the inclination angle θ in such a manner that θ=0. When the position of the bend 46 is identifiable in a case where the touch sensor 18 can be bent or curved at two or more points, the inclination value calculation circuit 64 may decide whether fourth conditions A or B are satisfied only with regard to the bend region 56 including the position of the bend 46.

At S7, the coordinate value calculation circuit 66 corrects the indicated position indicated by the electronic pen 14 (i.e., first coordinate values) by using the inclination value calculated at S5 or S6. This reduces the displacement of the indicated position that is based on the inclination angle θ. The pen detection function may use this inclination value to correct a state value (e.g., pen pressure value) other than the indicated position.

At S8, the microcontroller 24 performing the pen detection function supplies data including state values (more specifically, coordinate values, inclination value, pen pressure value, etc.) indicative of the state of the electronic pen 14 to the host processor 22. In this manner, the flowchart of FIG. 7 ends. The touch IC 20 is able to detect temporal changes in the state of the electronic pen 14 by performing the process shown in this flowchart successively at predetermined time intervals. Exemplary results of calculation of the inclination angle θ are described below with reference to FIGS. 9A and 9B and FIGS. 10A and 10B.

Figure 9A:
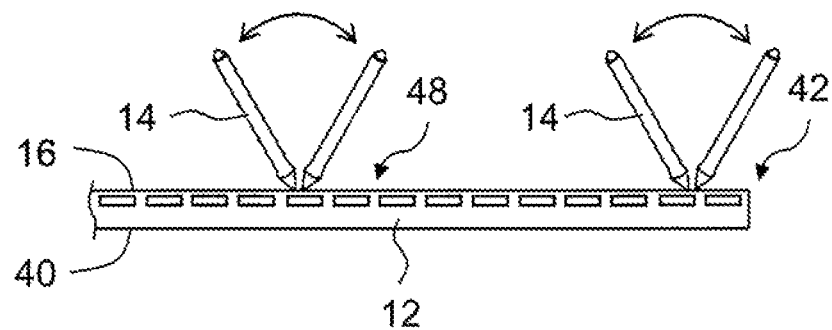
FIGS. 9A and 9B are diagrams illustrating a first exemplary result of inclination angle calculation.

FIG. 9A is a diagram illustrating a first behavior of the electronic pen 14. Let us assume a case where, for example, the user swings the electronic pen 14 in the left-right direction around a fixation point on the detection surface 16 at which the tip of the electronic pen 14 is fixed. The width and the cycle of the swing are assumed to be constant irrespective of the position of the fixation point.

Figure 9B:
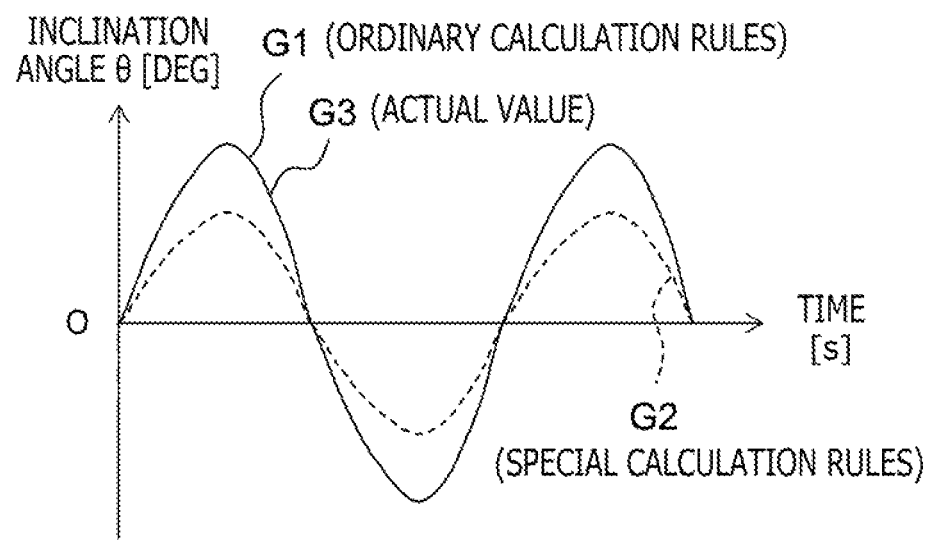

FIG. 9B is a diagram illustrating temporal changes in the inclination angle θ that is successively calculated based on the first behavior. The horizontal axis of a graph in FIG. 9B represents time (unit: seconds), whereas the vertical axis of the graph represents the inclination angle θ (unit: degrees). A solid-line curve G1 corresponds to the inclination angle θ calculated when the fixation point is at the general section 48, that is, the inclination angle θ calculated in accordance with the ordinary calculation rules. Meanwhile, a broken-line curve G2 corresponds to the inclination angle θ calculated when the fixation point is at the periphery 42, that is, the inclination angle θ calculated in accordance with the special calculation rules ("first conditions A" in FIG. 8). A curve G3 corresponds to an actual value of the inclination angle θ.

As is understandable from FIG. 9B, the behaviors indicated by the curves G1 to G3 vary in substantially the same cycle around θ=0 [degree]. The curve G1 has substantially the same shape as the curve G3. However, the curve G2 is shaped in such a manner as to indicate a narrower range of the inclination angle θ than the curve G1. In other words, the time-series of the inclination angle θ is smoothed by using the special calculation rules.

Figure 10A:
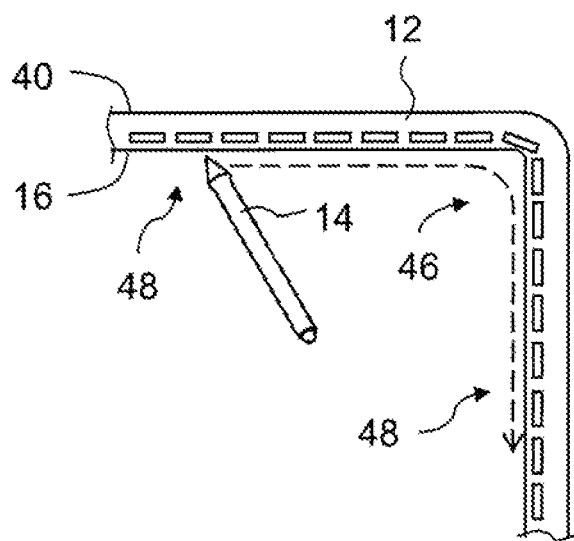
FIGS. 10A and 10B are diagrams illustrating a second exemplary result of inclination angle calculation.

FIG. 10A is a diagram illustrating a second behavior of the electronic pen 14. Let us assume a case where, for example, the user moves the electronic pen 14 in such a manner as to pass the bend 46 having an L-shaped curve. The detection surface 16 of the electronic device 12 is assumed to have a downwardly protrusion, L-shaped curve at the bend 46.

Figure 10B:
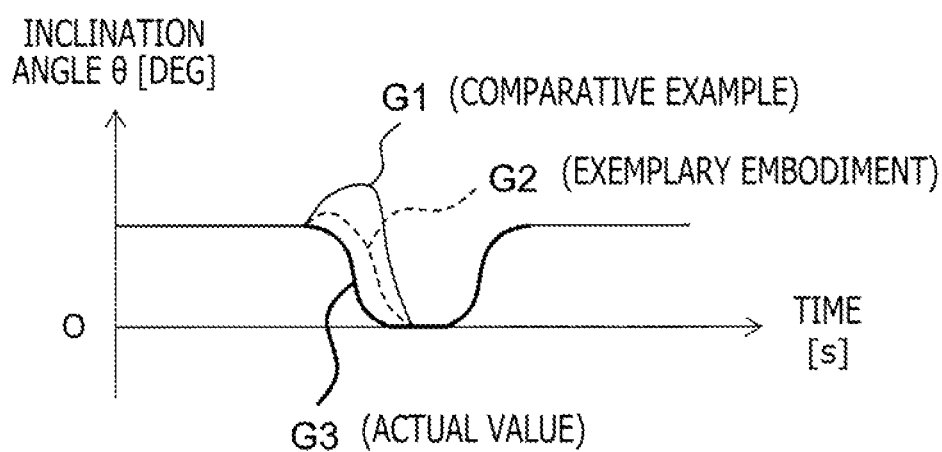

FIG. 10B is a diagram illustrating temporal changes in the inclination angle θ that is successively calculated based on the second behavior. The horizontal axis of a graph in FIG. 10B represents time (unit: seconds), whereas the vertical axis of the graph represents the inclination angle θ (unit: degrees). A solid-line curve G1 indicates a comparative example, a broken-line curve G2 indicates an exemplary embodiment, and a thick solid-line curve G3 indicates an actual value. The "comparative example" corresponds to a case where only the ordinary calculation rules are applied. The "exemplary embodiment" corresponds to a case where the ordinary calculation rules and the special calculation rules ("fourth conditions B" in FIG. 8) are applied.

As indicated by the curve G3, the user tends to perform a writing operation with the electronic pen 14 brought into perpendicular contact with the detection surface 16 in order to prevent the tip of the electronic pen 14 from slipping at the bend 46 having a curved recessed surface. In such an instance, the position Q2 is occasionally left undetected at the bend 46 as indicated by the curve G1 (comparative example) so that a quasi-state where the electronic pen 14 is suddenly inclined may be detected. In view of such circumstances, the calculation rules suitable for the bend 46 are applied as indicated by the curve G2 (exemplary embodiment). This partially smooths the time-series of the inclination angle θ. Consequently, obtained calculation results indicate a behavior close to the actual behavior of the electronic pen 14.

Summary of First Embodiment

As described above, the touch IC 20 is a pen state detection circuit that is connected to the touch sensor 18 of a capacitance type and adapted to detect the state of the electronic pen 14 in accordance with an output signal from the touch sensor 18. The touch sensor is configured such that the plurality of sensor electrodes 18x and 18y are disposed in a planar manner. The electronic pen 14 includes the tip electrode 30 (first electrode) and the upper electrode 32 (second electrode). The touch IC 20 sequentially and repeatedly performs an acquisition act (S2) and an inclination output act (including S5, S6, and S8). The acquisition act acquires the first coordinate values indicating the projected position of the tip electrode 30 and the second coordinate values indicating the projected position of the upper electrode 32, which are in a sensor coordinate system defined on the detection surface 16 of the touch sensor 18. The inclination output act calculates the inclination value indicative of the inclination of the electronic pen 14 from the acquired first coordinate values and second coordinate values in accordance with calculation rules, and outputs the calculated inclination value.

In the inclination output act (S6 and S8), the touch IC 20 then outputs an inclination value when decision conditions are satisfied. The outputted inclination value is different from an inclination value that is calculated in accordance with ordinary calculation rules when the decision conditions are not satisfied. The decision conditions represent a situation where at least one of the tip electrode 30 and the upper electrode 32 is potentially in a position interfering with the peripheries 42 and 44 or the bend 46 of the touch sensor 18 as viewed from above the detection surface 16. This inhibits unexpected calculation results from being obtained from the peripheries 42 and 44 or the bend 46 of the touch sensor 18 when the inclination of the electronic pen 14 having two electrodes is calculated.

Further, the touch IC 20 may operate in such a manner that time-series inclination values sequentially outputted from the peripheries 42 and 44 of the touch sensor 18 during the movement of the electronic pen 14 are more smoothed than time-series inclination values sequentially outputted from the general section 48 (central portion) of the touch sensor 18. Alternatively, the touch IC 20 may operate in such a manner that time-series inclination values sequentially outputted from the bend 46 of the touch sensor 18 during the movement of the electronic pen 14 are more smoothed than time-series inclination values sequentially outputted from the general section 48 (flat portion) of the touch sensor 18.

Second Embodiment

A pen pressure value output method according to a second embodiment of the present disclosure will now be described with reference to FIGS. 11 to 16. Elements or functions identical with those described in conjunction with the first embodiment are designated by the same reference numerals as the counterparts and may not be redundantly described.

<Overall Configuration of Input System 80>

Figure 11:
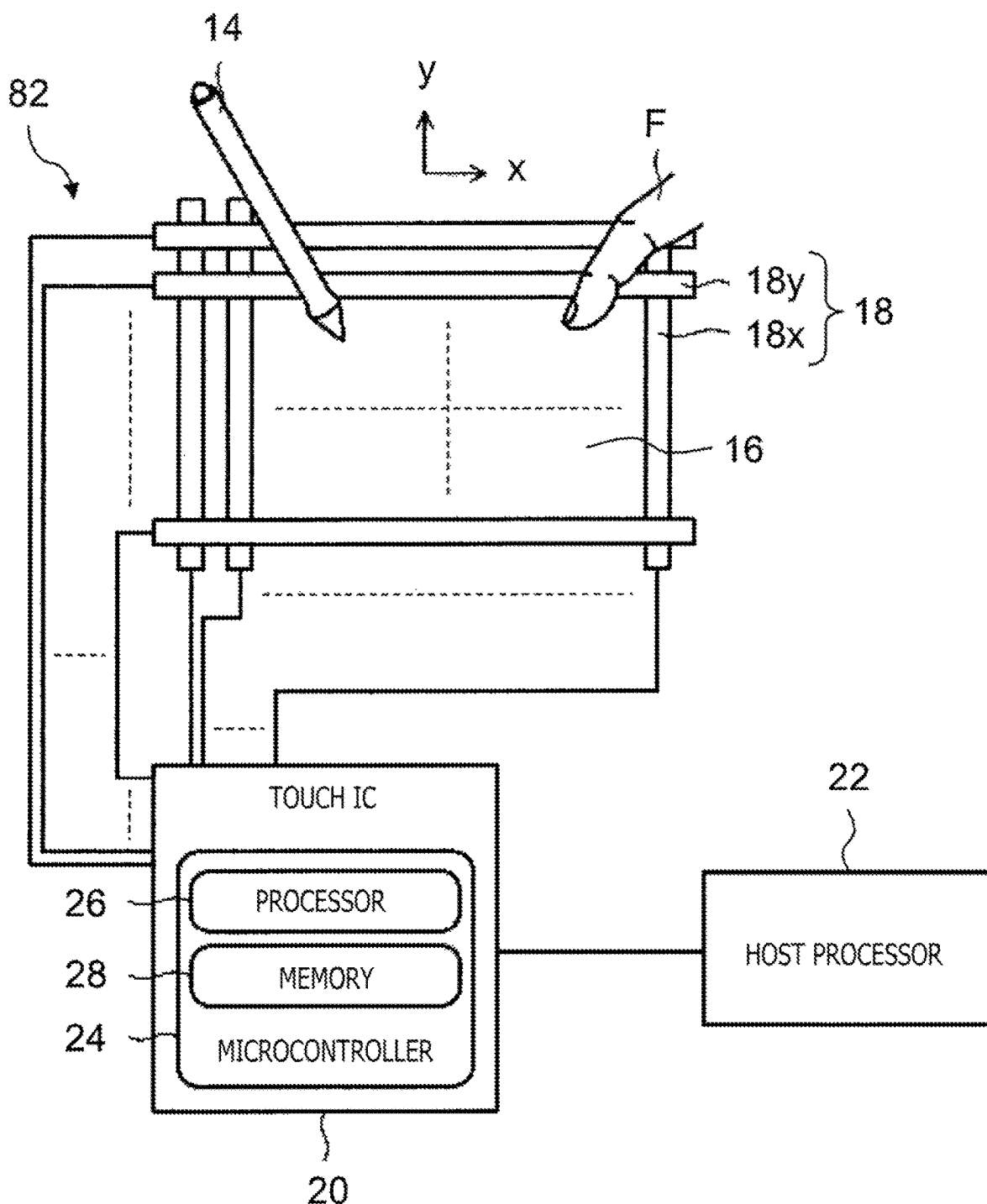
FIG. 11 is a diagram illustrating an example of an input system for performing a pen pressure value output method according to a second embodiment of the present disclosure.

FIG. 11 is a diagram illustrating an example of an input system 80 for performing the pen pressure value output method according to the second embodiment of the present disclosure. The input system 80 includes the electronic pen 14 and an electronic device 82. As is the case with the first embodiment, the electronic device 82 includes the touch sensor 18, the touch IC 20, and the host processor 22. However, the firmware of the touch IC 20 is capable of implementing a pen detection function that is different from the pen detection function in the first embodiment.

<Operation of Touch IC 20>

Figure 12:
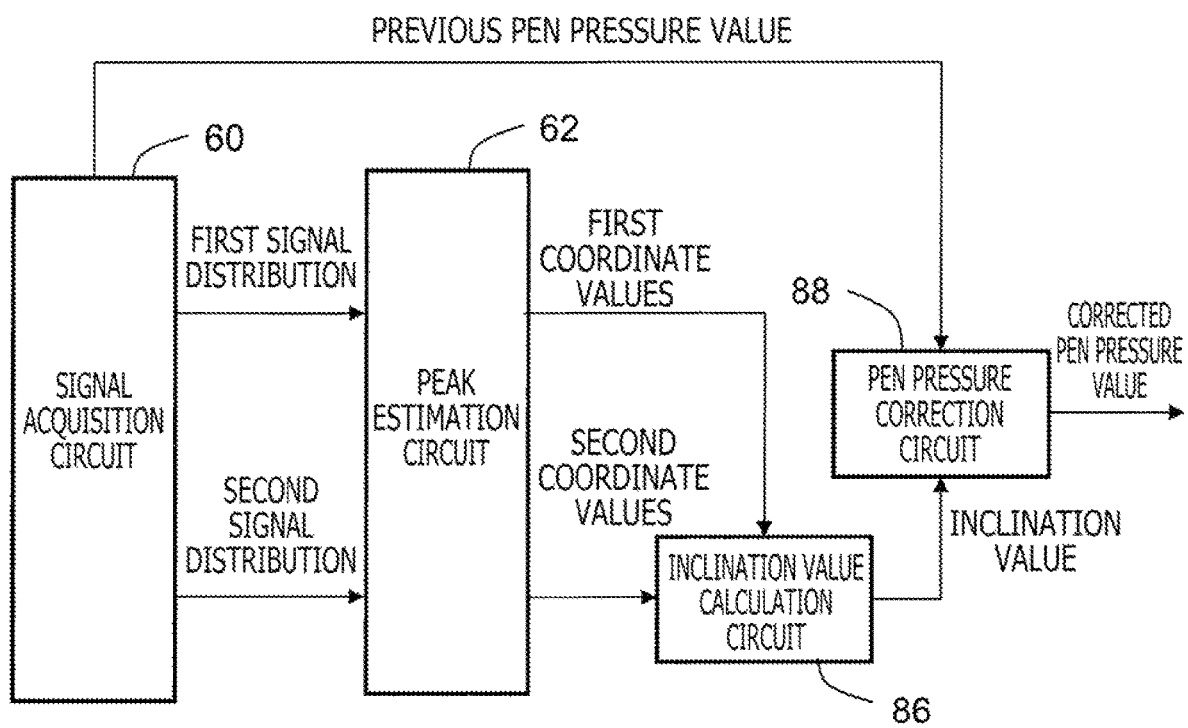
FIG. 12 is a block diagram illustrating a pen detection function of the touch IC depicted in FIG. 11.

FIG. 12 is a block diagram illustrating the pen detection function of the touch IC 20 depicted in FIG. 11. The pen detection function is implemented by an inclination value calculation circuit 86 and a pen pressure correction circuit 88 in addition to the signal acquisition circuit 60 and the peak estimation circuit 62. The functions of the inclination value calculation section circuit 86 and the pen pressure correction section circuit 88 may be performed by the processor 26 while processor 26 executes instructions stored in the memory 28. An operation performed by the touch IC 20 while the processor 26 executes instructions stored in the memory 28 to perform the pen detection function will now be described with reference to the flowchart of FIG. 13.

Figure 13:
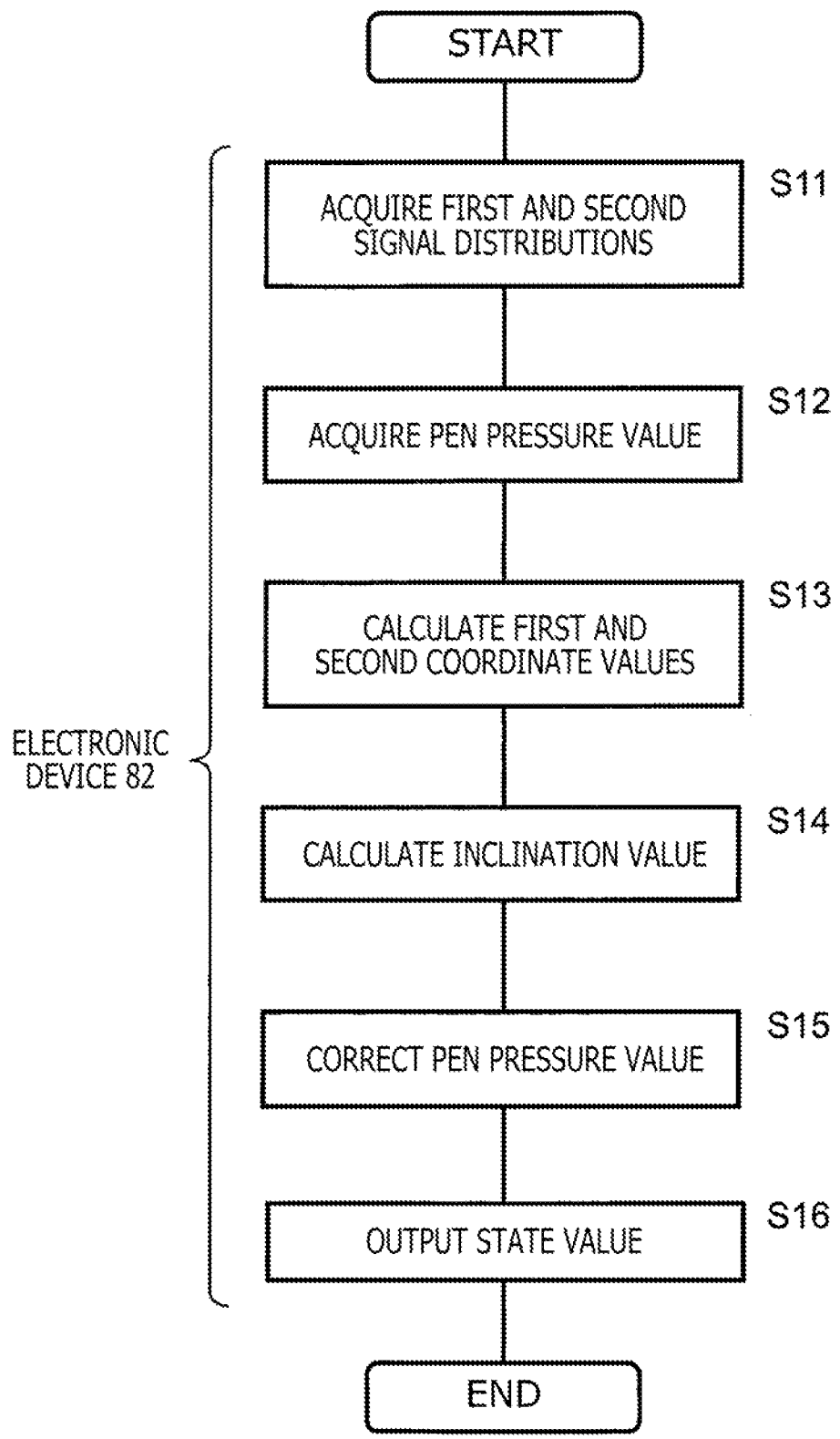
FIG. 13 is a flowchart illustrating execution of the pen detection function depicted in FIG. 12.

At S11 of FIG. 13, the signal acquisition circuit 60 acquires the first signal distribution and the second signal distribution from the touch sensor 18 through a scanning operation performed on each of the sensor electrodes 18x and 18y. This acquisition is performed in a similar manner as indicated at S1 of FIG. 7 and will not be described in detail.

At S12, the signal acquisition circuit 60 analyzes a downlink signal from the electronic pen 14, and acquires a pen pressure value indicating the pen pressure applied to the electronic pen 14. The pen pressure value correlates with the pen pressure axially applied to the electronic pen 14. For example, the pen pressure value is defined so that it increases with an increase in the pen pressure.

Figure 14:
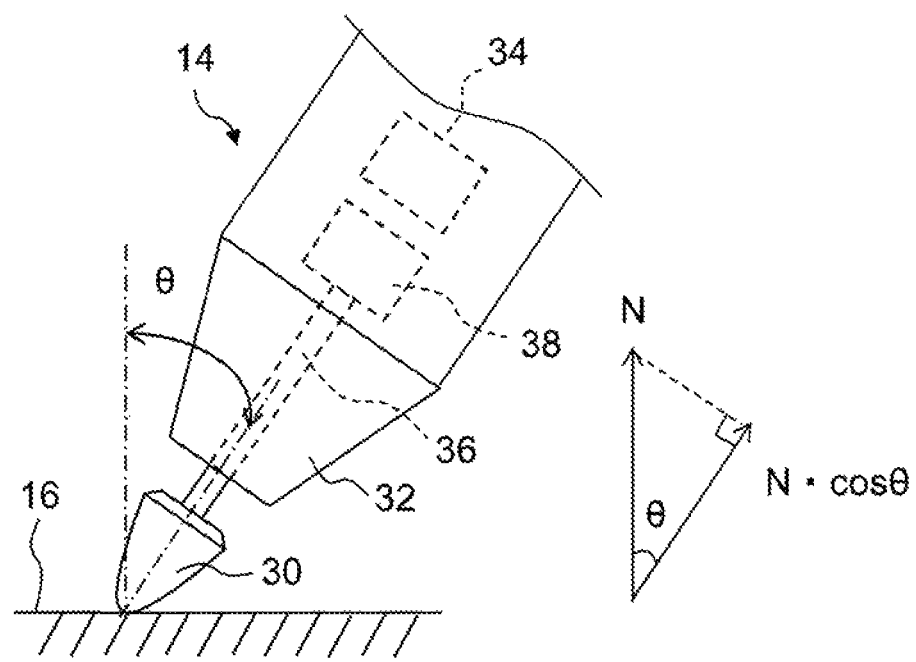
FIG. 14 is a schematic diagram illustrating a part of the electronic pen depicted in FIG. 11.

FIG. 14 is a schematic diagram illustrating a part of the electronic pen 14 depicted in FIG. 11. The electronic pen 14 includes a core body 36 and a pen pressure sensor 38 in addition to the tip electrode 30, the upper electrode 32, and the oscillator circuit 34. The core body 36 is connected at one end to the tip electrode 30 and at the other end to the pen pressure sensor 38. The pen pressure sensor 38 is a pressure sensor capable of measuring the pressure that is axially applied to the electronic pen 14. Specifically, the pen pressure sensor 38 may achieve detection by a capacitance method, a diffusion resistance method, a resistance line method, a film formation method, a deposition method, or a mechanical method.

When the electronic pen 14 is perpendicular to the detection surface 16 (θ=0), the pressure applied by the user via the electronic pen 14 is entirely transmitted to the pen pressure sensor 38 as normal force from the detection surface 16. However, when the electronic pen 14 is inclined from the normal line of the detection surface 16 (θ ≈0), the pressure applied by the user is multiplied by approximately cos θ so that the resulting decreased pressure is transmitted to the pen pressure sensor 38. It should be noted that the pen pressure axially applied to the electronic pen 14 varies with the pen inclination as described above.

At S13, the peak estimation circuit 62 acquires the first and second coordinate values by estimating the peak of each of the first and second signal distributions acquired at S11. This estimation is performed in a similar manner as indicated at S2 of FIG. 7 and will not be described in detail.

At S14, the inclination value calculation circuit 86 calculates an inclination value indicative of the pen inclination by using the first and second coordinate values acquired at S12. The inclination value calculation circuit 86 may calculate the inclination value in accordance with Equation (1) above or Equation (2) above.

At S15, the pen pressure correction circuit 88 uses the inclination value calculated at S14 to correct the pen pressure value acquired at S12. More specifically, the pen pressure correction circuit 88 corrects the pen pressure value by multiplying a previous pen pressure value by a correction multiplier M.

Figure 15:
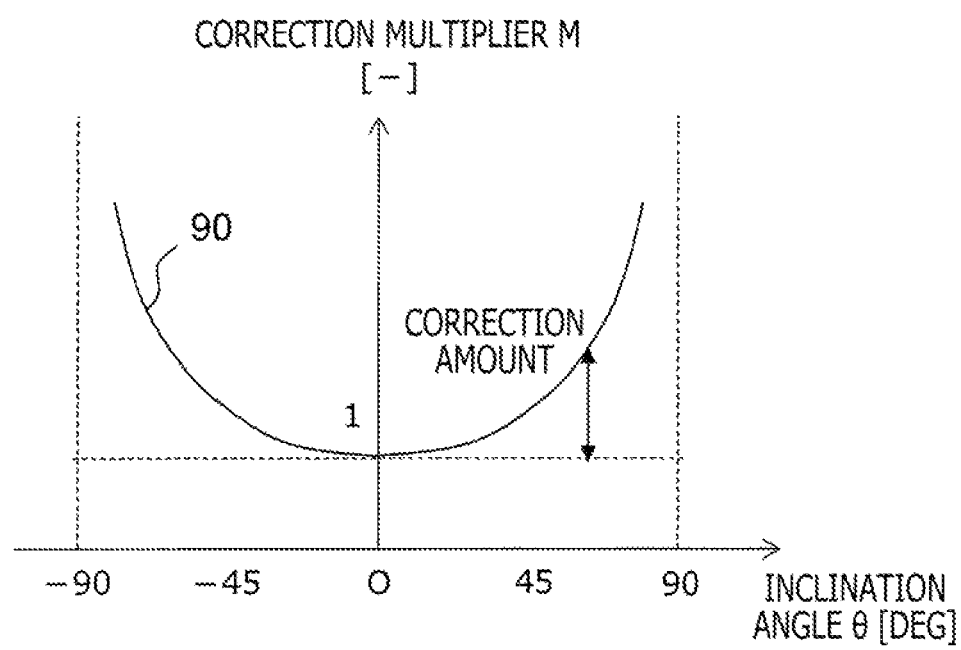
FIG. 15 is a diagram illustrating an example of a pen pressure correction property used for correcting a pen pressure value.
Figure 16:
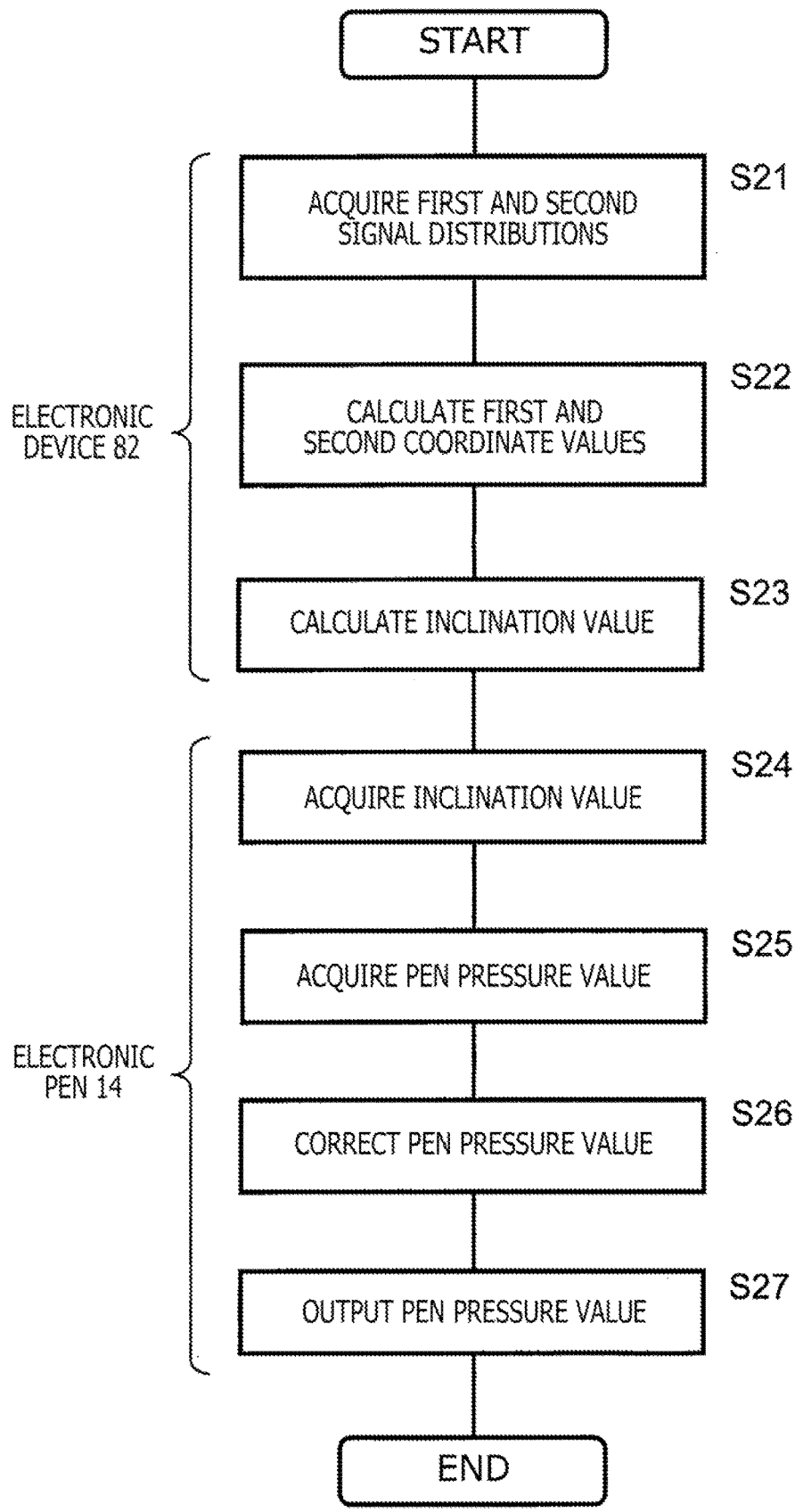
FIG. 16 is another flowchart illustrating a case where the electronic pen corrects the pen pressure value.

FIG. 15 is a diagram illustrating an example of a pen pressure correction property 90 used for correcting the pen pressure value. The horizontal axis of a graph in FIG. 15 represents the inclination angle θ (unit: degrees), whereas the vertical axis of the graph represents the correction multiplier M (unit: none). The pen pressure correction property 90 is a function such that the correction multiplier M monotonically increases with an increase in the absolute value |θ| of the inclination angle θ. When, for example, $M(θ)=\sec θ=1/\cos θ$ is satisfied, $M(θ)=1$, $M(45)=\sqrt{2}$, and $M(60)=\sqrt{3}$ is established.

The pen pressure correction property 90 is not limited to a function shape exemplified in FIG. 15, but may be a function shape based on the mechanical structure of the electronic pen 14 or the detection performance of the pen pressure sensor 38. Further, pen pressure value correction may be achieved by the addition of a correction amount ΔC instead of the above-mentioned multiplication by the correction multiplier M.

At S16, the pen detection function supplies data including state values (e.g., coordinate values, inclination value, and corrected pen pressure value) indicative of the state of the electronic pen 14 to the host processor 22. In this manner, the flowchart of FIG. 13 ends. The touch IC 20 is able to detect temporal changes in the state of the electronic pen 14 by performing the process of this flowchart successively at predetermined time intervals.

Summary of Second Embodiment

As described above, the pen pressure value output method uses the input system 80 that includes the electronic pen 14, which has the pen pressure sensor 38 capable of measuring an axially applied pen pressure, and the electronic device 82, which has the detection surface 16 for detecting the state of the electronic pen 14. The electronic device 82 acquires an inclination value indicative of the inclination of the electronic pen 14 from the normal line of the detection surface 16 (S14), corrects a pen pressure value indicative of a pen pressure measured by the pen pressure sensor 38 by using the pen pressure correction property 90, which monotonically increases a correction amount for the inclination value (S15), and outputs the corrected pen pressure value (S16). This makes it possible to reduce the tendency where the value detected by the pen pressure sensor 38 relatively decreases with an increase in the inclination of the electronic pen 14 from the normal line of the detection surface 16. Consequently, the resulting pen pressure output matches the user's operation feeling of the electronic pen 14.

<Alternative Flowchart>

In the above example, the touch IC 20 in the electronic device 82 calculates the pen pressure value (S14), corrects the pen pressure value (S15), and outputs the pen pressure value (16). However, such acts may alternatively be performed by the electronic pen 14. When such an alternative scheme is adopted, the input system 80 operates in accordance with the flowchart depicted in FIG. 16.

The electronic device 82 acquires the first and second signal distributions (S21), then calculates the first and second coordinate values (S22), and calculates the inclination value (S23). Next, the electronic device 82 transmits an uplink signal including the inclination value calculated at S23 to the electronic pen 14. The electronic pen 14 acquires the inclination value included in the uplink signal received from the electronic device 82 (S24), then acquires the pen pressure value from the pen pressure sensor 38 (S25), and corrects the pen pressure value by using the inclination value (S26). Subsequently, the electronic pen 14 outputs the inclination value corrected at S26 as a downlink signal to the electronic device 82. Even when the above-described configuration is adopted, it is possible to provide advantages similar to those provided by the second embodiment, that is, obtain a pen pressure output matching the operation feeling.

Third Embodiment

A pen state detection circuit and a pen state detection method according to a third embodiment of the present disclosure will now be described with reference to FIGS. 17 to 25B. Elements or functions identical with those described in conjunction with the first embodiment are designated by the same reference numerals as the counterparts and may not be redundantly described.

<Overall Configuration of Input System 100>

Figure 17:
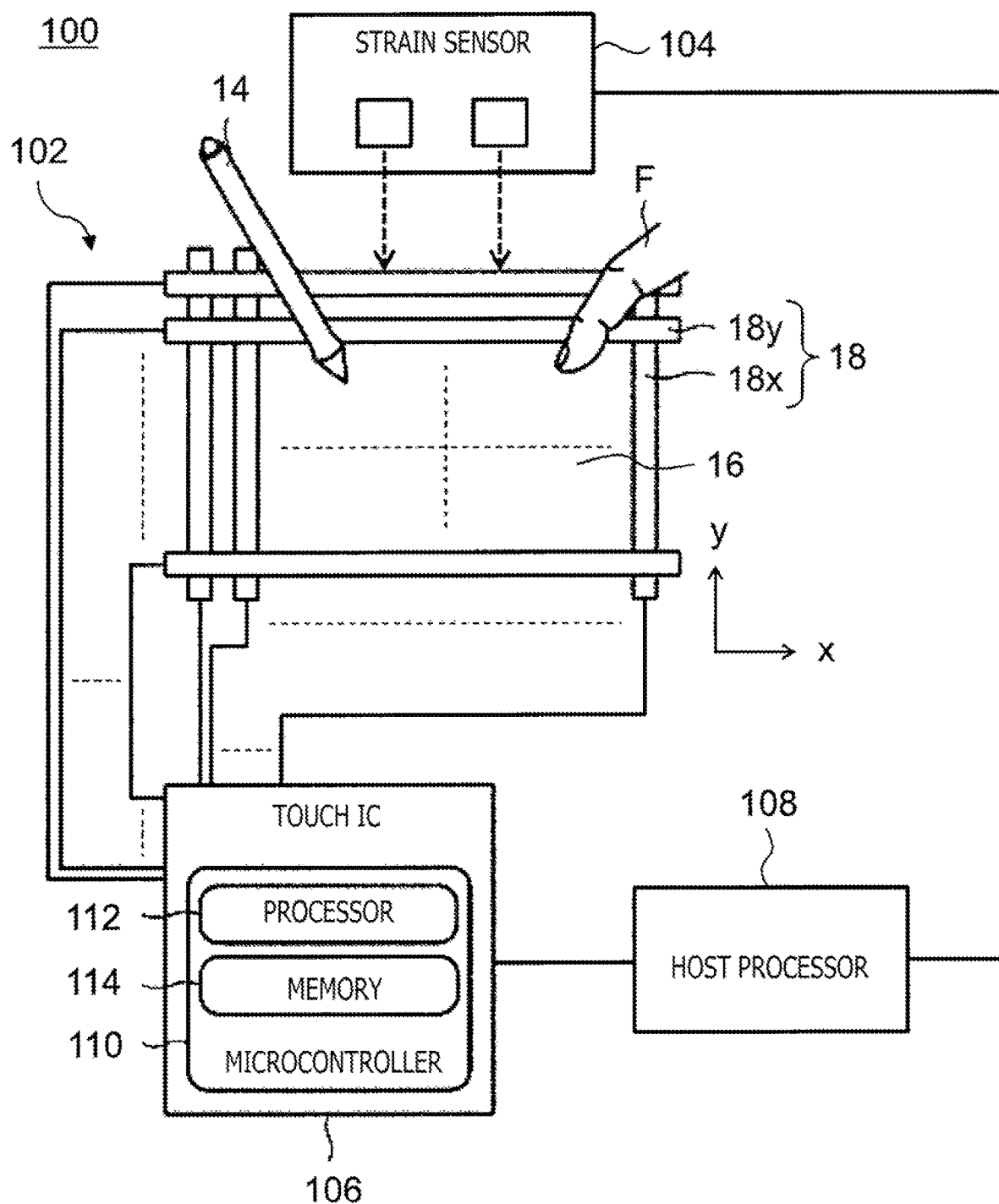
FIG. 17 is a diagram illustrating an example of an input system incorporating the pen state detection circuit according to a third embodiment of the present disclosure.

FIG. 17 is a diagram illustrating an example of an input system 100 incorporating the pen state detection circuit according to the third embodiment of the present disclosure. The input system 100 basically includes the electronic pen 14 and an electronic device 102. The electronic device 102 is a foldable terminal that includes, for example, the touch sensor 18, one or more strain sensors 104, a touch IC 106 functioning as the pen state detection circuit, and a host processor 108.

The strain sensors 104 detect changes in the shape of the touch sensor 18 that occur due to the deformation function of the electronic device 102. In a case where, for example, the electronic device 102 is inflexible, the strain sensors 104 are disposed around a position where the touch sensor 18 bends. Meanwhile, in a case where the electronic device 102 is flexible, the strain sensors 104 are disposed so as to cover the entire surface of the touch sensor 18.

The touch IC 106 is an integrated circuit that includes a microcontroller 110 having a processor 112 and a memory 114, wherein the processor 112 is capable of executing firmware (e.g., instructions) stored in the memory 114, and is connected to the plurality of sensor electrodes 18x and 18y. The microcontroller 110 is capable of implementing a touch detection function and a later-described pen detection function. The touch detection function is the same as or different from the touch detection function described in connection with FIG. 1.

The host processor 108 includes a CPU or a GPU, and performs similar processing to the processing by the host processor 22. The above-mentioned one or more strain sensors 104 are connected to the host processor 108.

<Operation of Touch IC 106>

Figure 18:
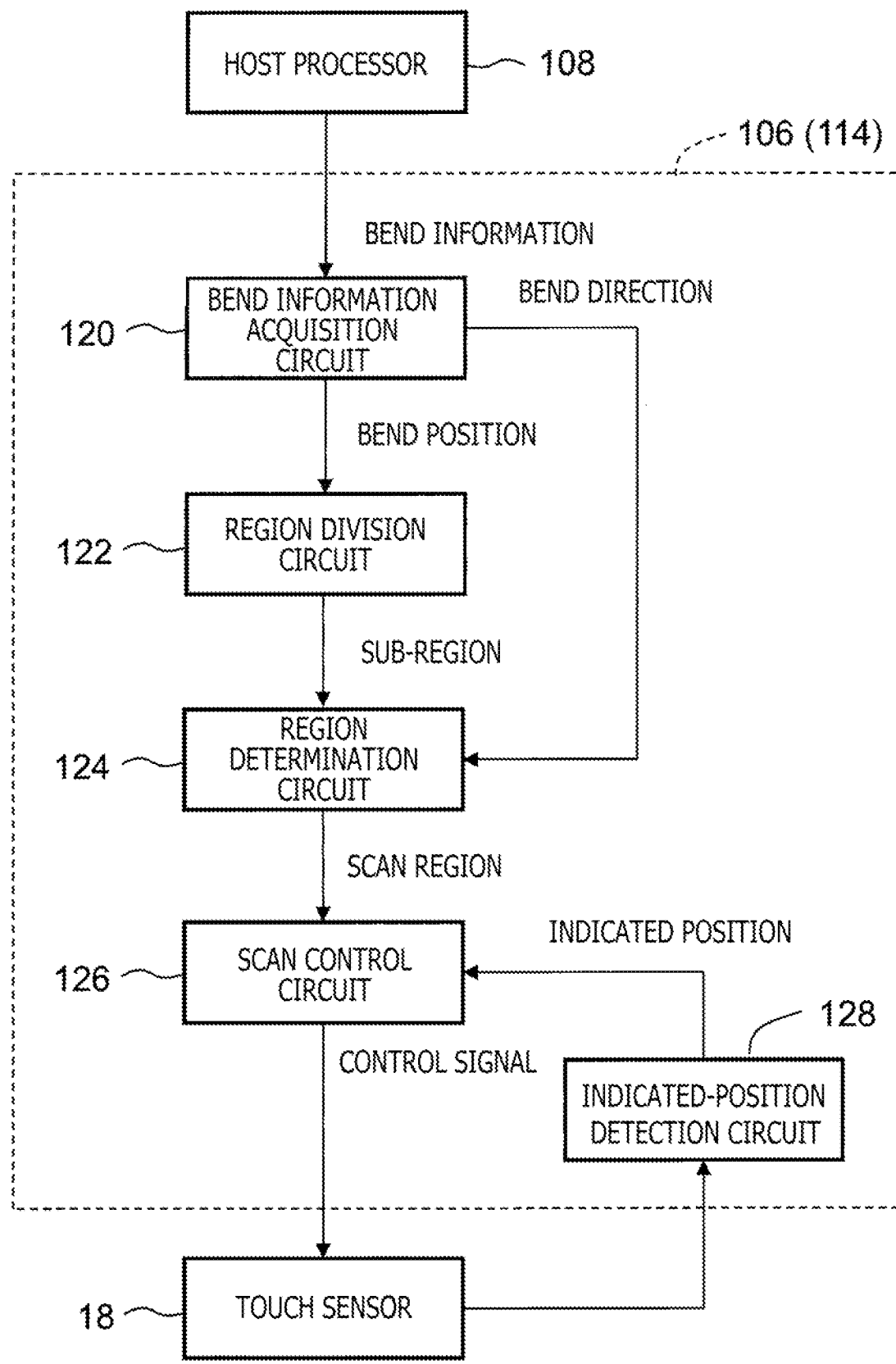
FIG. 18 is a block diagram illustrating a pen detection function of the touch IC depicted in FIG. 17.

FIG. 18 is a block diagram illustrating the pen detection function of the touch IC 106 depicted in FIG. 17. The pen detection function is implemented by a bend information acquisition circuit 120, a region division circuit 122, a region determination circuit 124, a scan control circuit 126, and an indicated-position detection circuit 128. The functions of the bend information acquisition circuit 120, region division circuit 122, region determination circuit 124, scan control circuit 126, and indicated-position detection circuit 128 may be performed by the processor 112 while processor 112 executes instructions stored in the memory 114. An operation performed by the touch IC 106 while the processor 112 executes instructions stored in the memory 114 to perform the pen detection function 114 will now be described with reference to the flowchart of FIG. 19.

At S31 of FIG. 19, the bend information acquisition circuit 120 acquires information (hereinafter referred to as "bend information") indicative of a bent shape of the touch sensor 18 on a periodic or non-periodic basis from the host processor 108. Before this acquisition, the host processor 108 generates the bend information regarding the touch sensor 18 by using sensor signals outputted from the one or more strain sensors 104.

Figure 20:
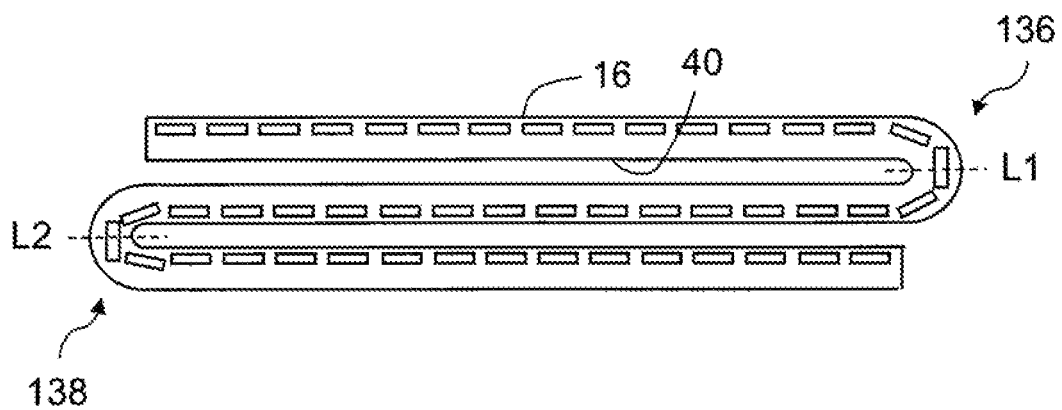
FIG. 20 is a schematic side cross-sectional view illustrating an electronic device depicted in FIG. 17.

FIG. 20 is a schematic side cross-sectional view illustrating the electronic device 102 depicted in FIG. 17. Linearly disposed rectangles schematically represent the sensor electrodes 18x and 18y (FIG. 1), which are arrayed in a planar manner. In the example of FIG. 20, the electronic device 102, which is flat, is folded into a substantially Z-shape in such a manner that a part of the detection surface 16 faces outward.

In the example of FIG. 20, the above-mentioned bend information includes information for identifying two bends 136 and 138. More specifically, the bend information includes "2," which indicates the number of bends 136 and 138, "coordinate values of folding lines L1 and L2," which indicates the positions of the bends 136 and 138, "mountain fold/valley fold," which indicates the orientation of the bends 136 and 138, and "bending amount," which indicates the bending level of the bends 136 and 138.

At S32, the bend information acquisition circuit 120 analyzes the bend information acquired at S31 to thereby determine whether or not the touch sensor 18 is deformed. If the touch sensor 18 is not deformed ("NO" at S32), processing returns to S31, and sequentially repeats S31 and S32 until the touch sensor 18 is determined to be deformed. Meanwhile, if the touch sensor 18 is determined to be deformed ("YES" at S32), processing proceeds to the next act, that is, S33.

At S33, the region division circuit 122 divides a sensor region 140 of the touch sensor 18 by using the bend information acquired at S31. More specifically, the region division circuit 122 sets a plurality of sub-regions 141 to 144 that are partitioned by one or more bending lines identified by the bend information.

Figure 21A:
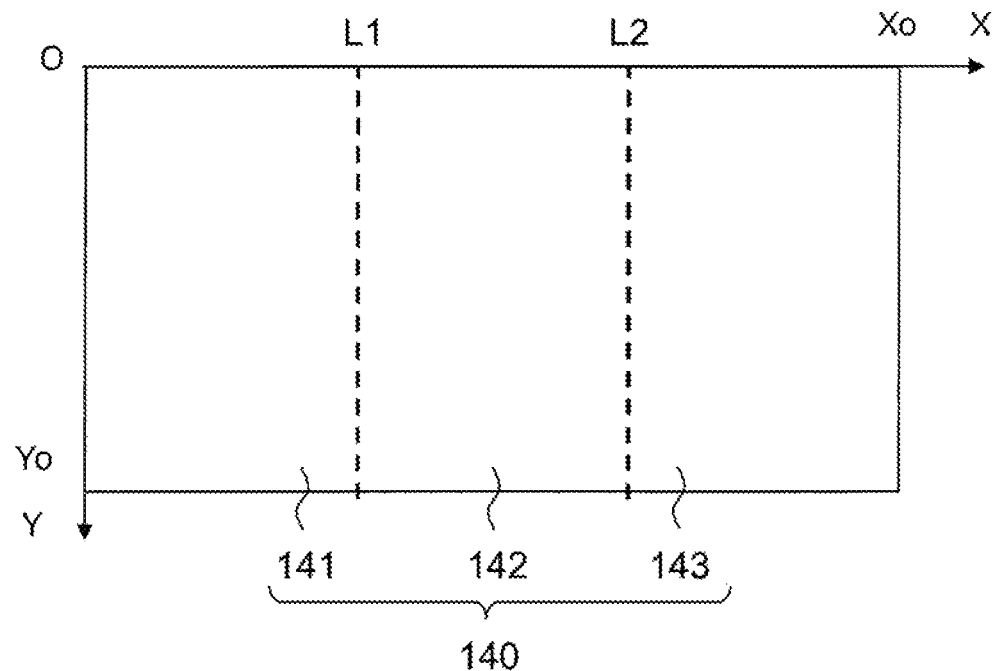
FIGS. 21A and 21B are diagrams illustrating exemplary methods of dividing the sensor region.
Figure 21B:
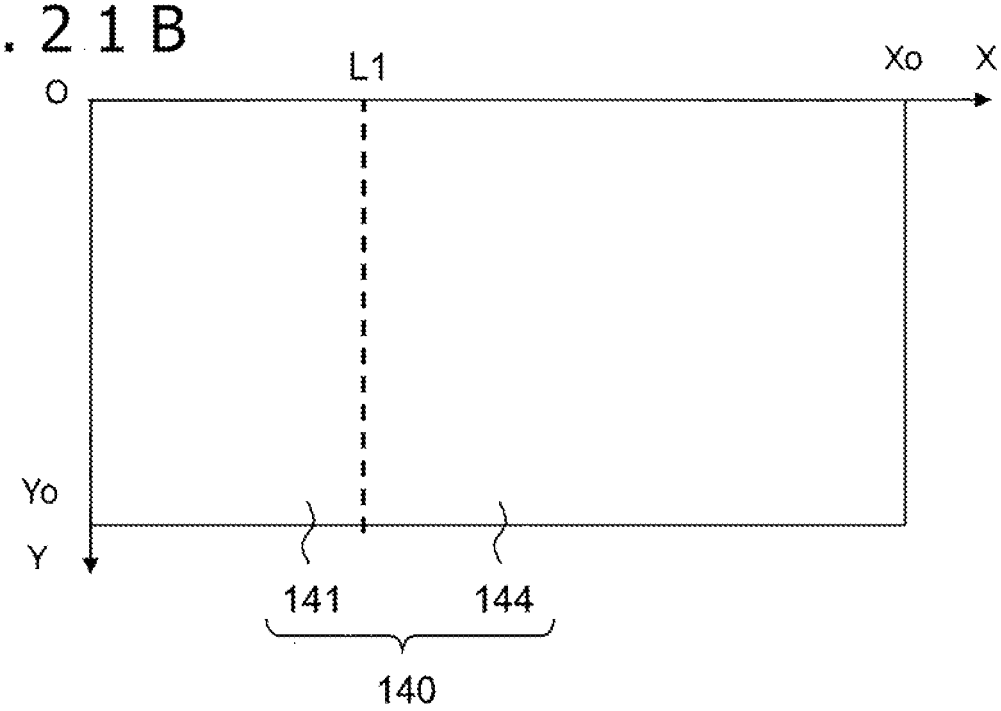

FIGS. 21A and 21B are diagrams illustrating exemplary methods of dividing the sensor region 140. In a case where the touch sensor 18 is folded along two folding lines L1 and L2 as depicted in FIG. 21A, the region division circuit 122 divides the rectangular sensor region 140 into three sub-regions 141, 142, and 143 that are partitioned by the two folding lines L1 and L2. Meanwhile, in a case where the touch sensor 18 is folded along one folding line L1 as depicted in FIG. 21B, the region division circuit 122 divides the rectangular sensor region 140 into two sub-regions 141 and 144 that are partitioned by one folding line L1.

At S34, the region determination circuit 124 determines one or more scan regions 146 from a plurality of sub-regions 141 to 143 divided at S33. More specifically, the region determination circuit 124 determines the one or more scan regions 146 that are adjacent to the position of the bend 136 identified by the bend information (i.e., adjacent to the folding lines L1 and L2). Alternatively, the region determination circuit 124 may estimate the three-dimensional shape of the touch sensor 18 from the acquired bend information, and determine a region accessible by the electronic pen 14 (a part or whole of the sensor region 140) as the scan region 146.

At S35, the region determination circuit 124 instructs the scan control circuit 126 to change the scan region 146. The scan control circuit 126 then exercises drive control over the touch sensor 18 in such a manner as to scan for the electronic pen 14 in a newly determined scan region 146.

Figure 19:
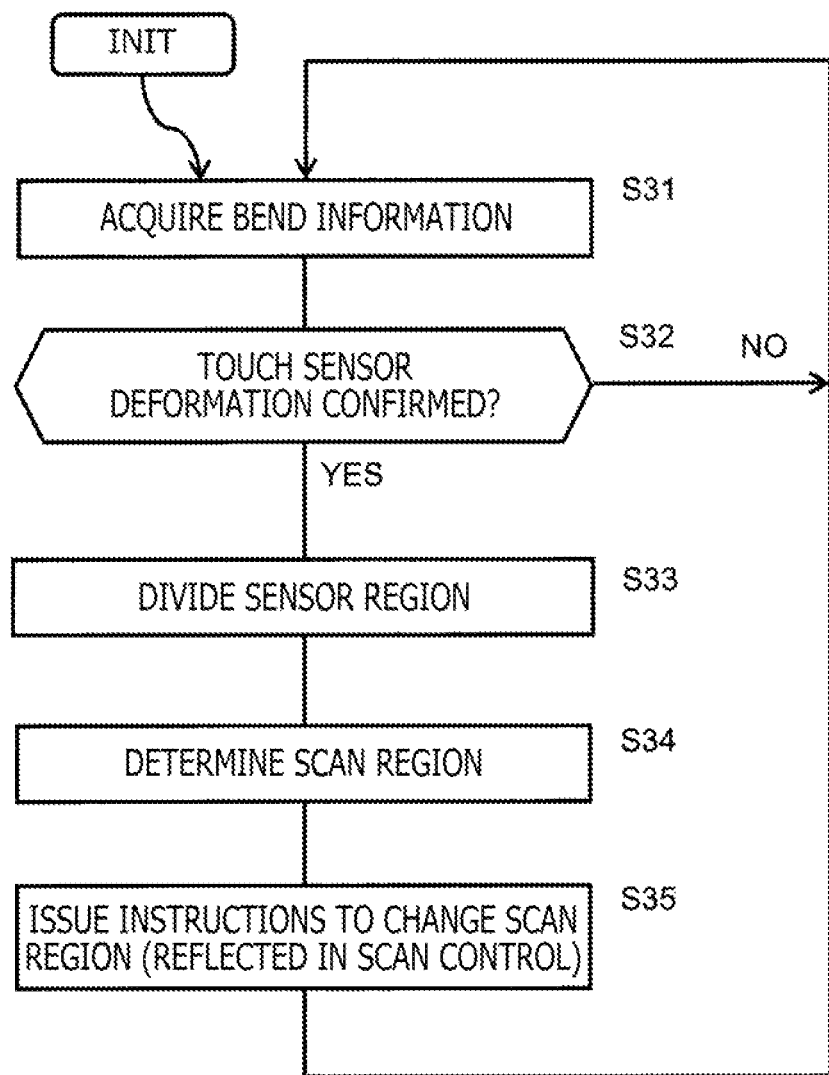
FIG. 19 is a flowchart illustrating execution of the pen detection function depicted in FIG. 18.

Subsequently, processing returns to S31 and the process of the flowchart of FIG. 19 is repeatedly performed. In other words, the touch IC 106 detects temporal changes in the state of the electronic pen 14 while dynamically changing the scan region 146 each time the deformation of the touch sensor 18 is detected. Results of determination of the scan region 146, which are dependent on various deformations of the electronic device 102, will now be described with reference to FIGS. 22A to 24B.

Figure 22A:
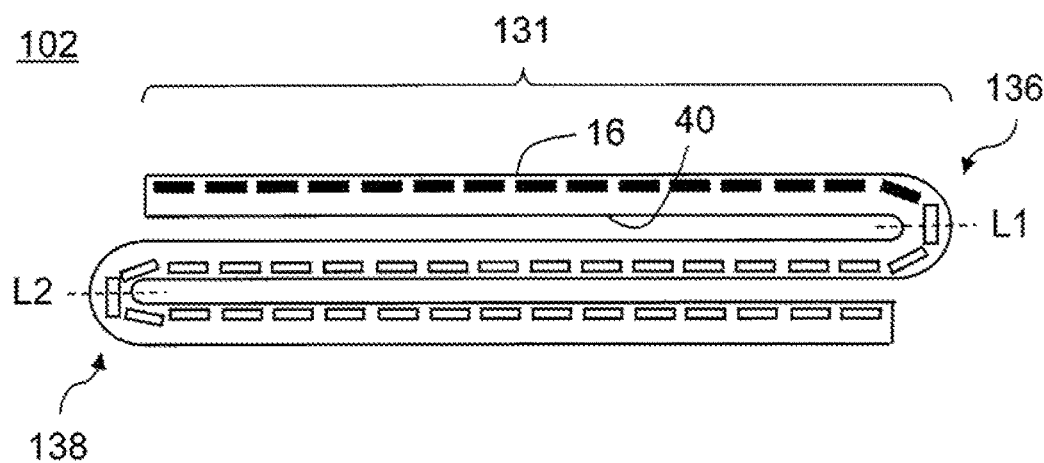
FIGS. 22A and 22B are diagrams illustrating a first exemplary result of a scan region determination.
Figure 22B:
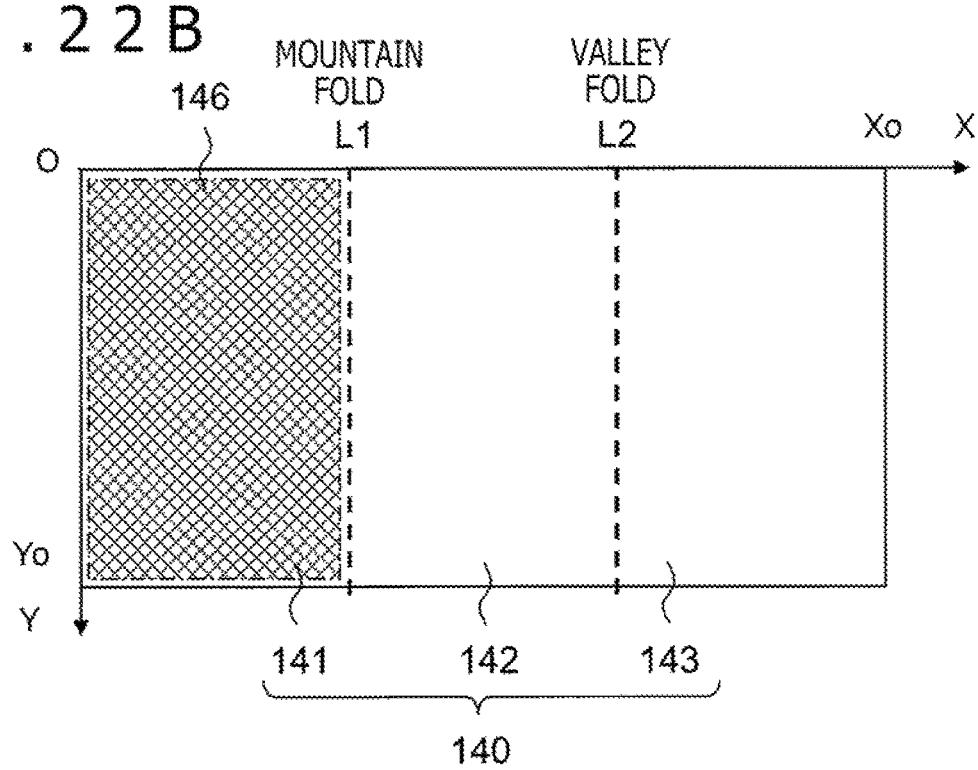

FIGS. 22A and 22B are diagrams illustrating a first exemplary result of determination of the scan region 146. As depicted in FIG. 22A, when mountain-folded along the folding line L1 and valley-folded along the folding line L2, the electronic device 102 is deformed into a substantially Z-shape as viewed laterally. Stated differently, in a first deformation state, only a part (exposed portion 131) of the detection surface 16 is exposed. In this case, as depicted in FIG. 22B, one sub-region 141 corresponding to the exposed portion 131 is determined as the scan region 146.

Figure 23A:
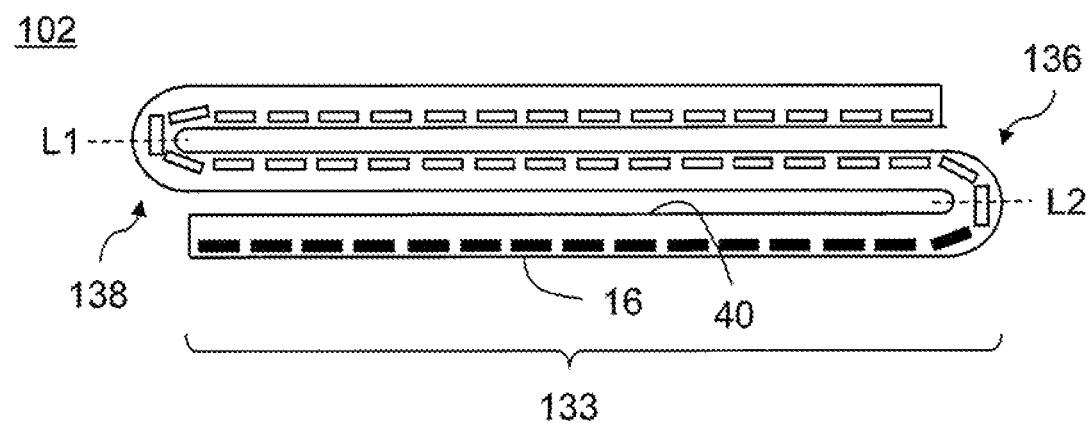
FIGS. 23A and 23B are diagrams illustrating a second exemplary result of a scan region determination.
Figure 23B:
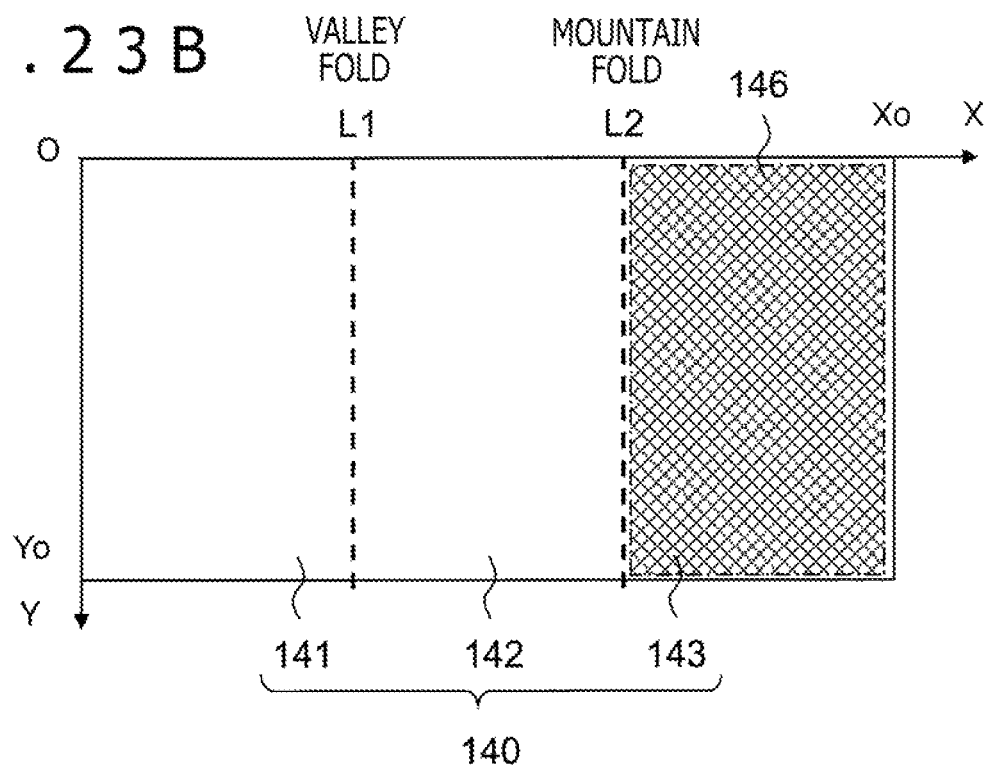

FIGS. 23A and 23B are diagrams illustrating a second exemplary result of determination of the scan region 146. As depicted in FIG. 23A, when valley-folded along the folding line L1 and mountain-folded along the folding line L2, the electronic device 102 is deformed into a substantially S-shape as viewed laterally. Stated differently, in a second deformation state, only a part (exposed portion 133) of the detection surface 16 is exposed. In this case, as depicted in FIG. 23B, one sub-region 143 corresponding to the exposed portion 133 is determined as the scan region 146.

Figure 24A:
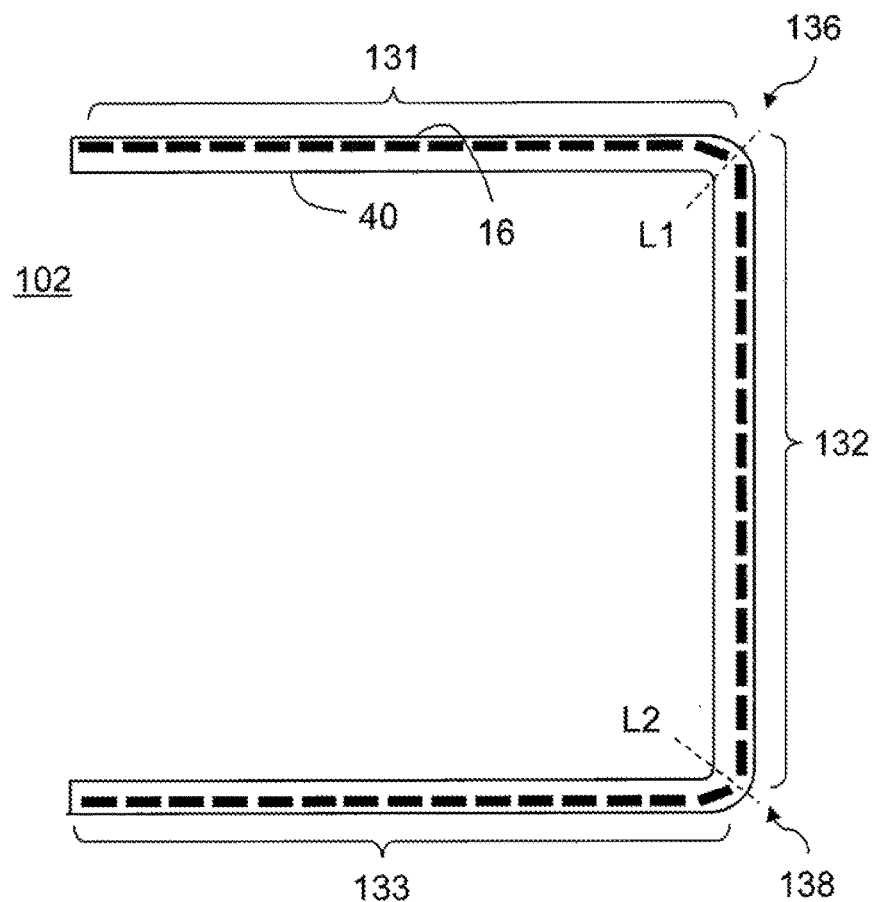
FIGS. 24A and 24B are diagrams illustrating a third exemplary result of a scan region determination.
Figure 24B:
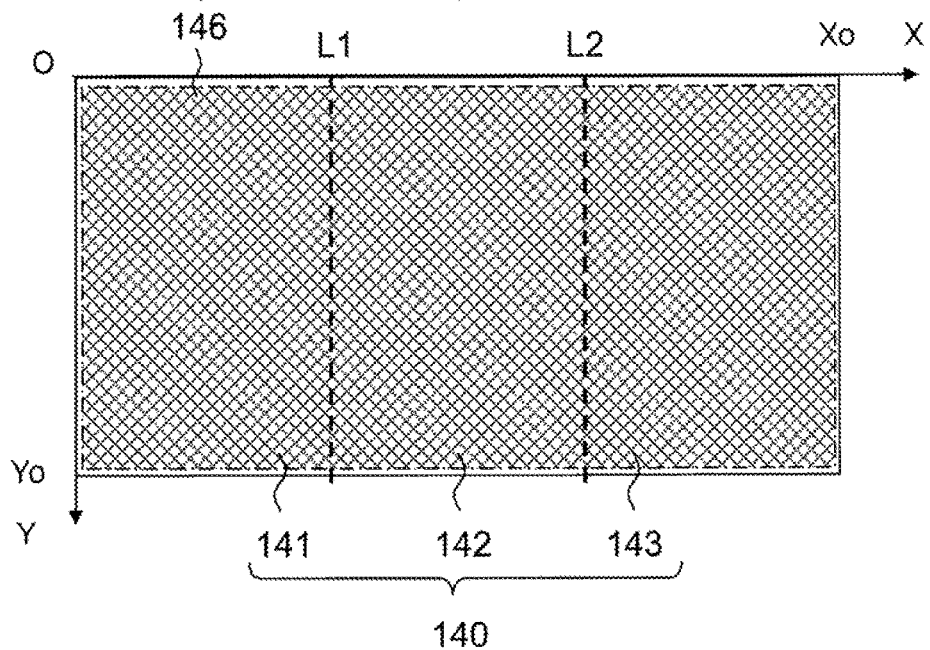

FIGS. 24A and 24B are diagrams illustrating a third exemplary result of determination of the scan region 146. As depicted in FIG. 24A, the electronic device 102 is bent into an L-shape when mountain-folded along the folding line L1, and bent into an L-shape when mountain-folded along the folding line L2. As a result, the electronic device 102 is deformed into a substantially C-shape as viewed laterally. Stated differently, in a third deformation state, the whole of the detection surface 16 (exposed portions 131, 132, and 133) is exposed. In this case, as depicted in FIG. 24B, three sub-regions 141 to 143 corresponding to the exposed portions 131 to 133 are determined as the scan region 146.

Summary of Third Embodiment

As described above, the touch IC 106 is a pen state detection circuit that is connected to the touch sensor 18 of a capacitance type and adapted to detect the state of the electronic pen 14 in accordance with an output signal from the touch sensor 18. The touch sensor 18 can be bent or curved at two or more points and configured such that the plurality of sensor electrodes 18$x$ and 18$y$ are disposed in a planar manner. The touch IC 106 acquires bend information including the information regarding the bends 136 and 138 of the touch sensor 18 (S31), determines the one or more scan regions 146 adjacent to the positions of the bends 136 and 138 identified by the bend information (adjacent to the folding lines L1 and L2), which are in the sensor region 140 of the touch sensor 18 (S34), and exercises drive control over the touch sensor 18 in such a manner as to scan for the electronic pen 14 in only the determined scan region 146.

The above-described configuration makes it possible to determine the scan region 146 suitable for the bent shape of the touch sensor 18. As a result, scanning is executed more frequently than when the entire sensor region 140 is constantly scanned. This provides improved response in the detection of the electronic pen 14.

Further, information regarding bend directions associated with the positions of the bends 136 and 138 may be included as position information, and the touch IC 106 may use the positions and the bend directions of the bends 136 and 138 identified by the bend information to thereby estimate the exposed portions 131 to 133 of the touch sensor 18 that are accessible by the electronic pen 14, and determine the sub-regions 141 to 143 corresponding to the exposed portions 131 to 133 as the scan region 146. This ensures that unexposed regions, which are unlikely to be used due to the current shape of the touch sensor 18, are excluded from the scan region 146.

<Modifications of Scanning Operation>

[1] The above-described scan control is applicable not only to the electronic pen 14, but also to various types of dielectrics including the finger F of the user. For example, the touch IC 106 may acquire the bend information including the information regarding the positions of the bends 136 and 138 of the touch sensor 18, determine the one or more scan regions 146 adjacent to the positions of the bends 136 and 138 identified by the bend information, which are in the sensor region 140 of the touch sensor 18, and exercise drive control over the touch sensor 18 in such a manner as to scan only the determined scan region 146 to determine whether the detection surface 16 is touched by the user.

[2] Further, the scan control circuit 126 may scan the whole of the determined scan region 146 or temporarily stop the scanning of a part of the determined scan region 146. As an example of the latter case, the scan control circuit 126 may change the scan control in accordance with the results of detection of the electronic pen 14 by the indicated-position detection circuit 128.

Figure 25A:
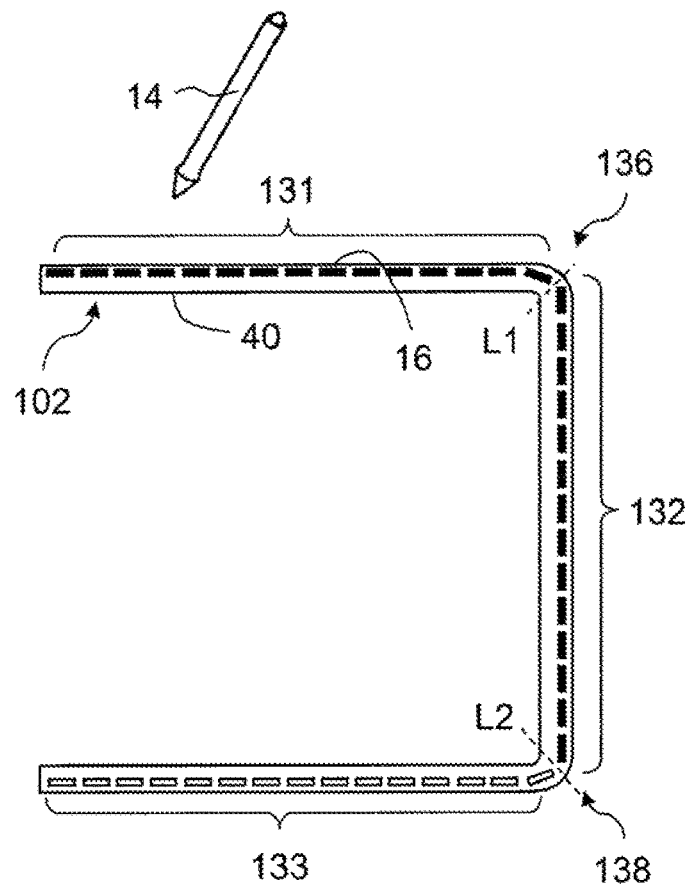
FIGS. 25A and 25B are diagrams illustrating an example of an alternative scanning operation performed by a scan control circuit.
Figure 25B:
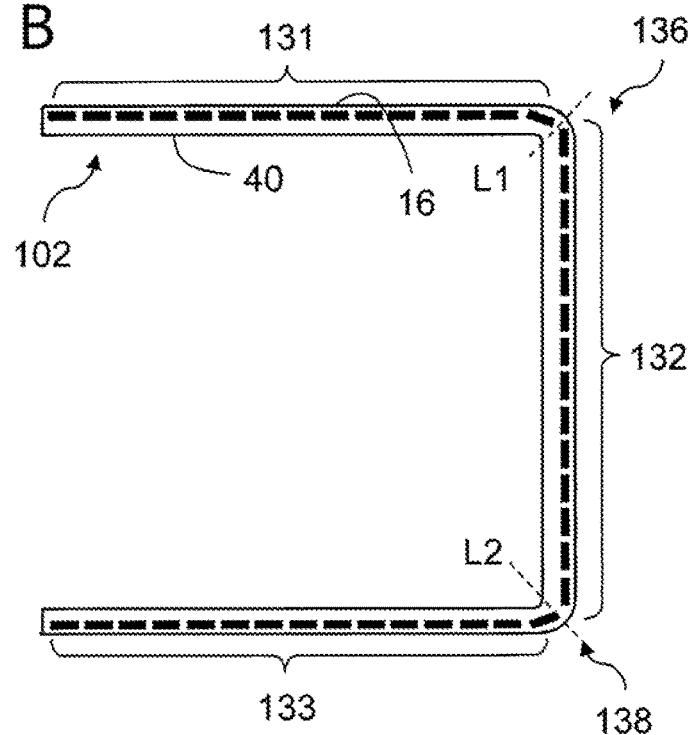

FIGS. 25A and 25B are diagrams illustrating an example of an alternative scanning operation performed by the scan control circuit 126. In this example, the electronic device 102 is deformed into a substantially C-shape as viewed laterally, as is the case with FIG. 24A. Stated differently, the touch sensor 18 is bent in such a manner that a pair of exposed portions 131 and 133 face in opposite directions.

As depicted in FIG. 25A, while the electronic pen 14 is detected by neither of the exposed portions 131 and 132, the scan control circuit 126 continuously scans all the sub-regions 141 to 143 included in the scan region 146. By contrast, as depicted in FIG. 25B, while the electronic pen 14 is detected by only one exposed portion 131, the scan control circuit 126 temporarily stops the scanning of the sub-region 143 corresponding to the other exposed portion 133.

As described above, while the electronic pen 14 is detected only in one sub-region 141 among a pair of sub-regions 141 and 143 corresponding to the pair of exposed portions 131 and 133 in a case where the touch sensor 18 is bent or curved in such a manner that the pair of exposed portions 131 and 133 face in opposite directions, the scan control circuit 126 of the touch IC 106 may exercise drive control over the touch sensor 18 in such a manner as to temporarily stop the scanning for the electronic pen 14 in the other sub-region 143.

[3] Moreover, in order to exercise scan control suitable for the state of the electronic device 102, the bend information acquisition circuit 120 may not only detect a state where deformation caused by bending is completed, but also detect an intermediate state where the deformation is in progress or detect temporal changes in the shape. For example, the touch IC 106 may disable the detection of a user's touch on the detection surface 16 while the electronic device 102 is being deformed. This inhibits the electronic device 102 from performing an operation not intended by the user even in a case where the finger F touches the detection surface 16 during a user's bending operation. Specifically, the above-mentioned "disabling of detection" is accomplished by (1) stopping detection by temporarily stopping the scanning in the scan region 146, (2) refraining from supplying relevant position information to the host processor 108 even when a touch is detected in the scan region 146, or (3) supplying the position information regarding a touch as well as a disable flag indicative of disabled detection to the host processor 108.

It is to be noted that the embodiments of the present disclosure are not limited to the foregoing embodiments, and that various changes can be made without departing from the spirit of the present disclosure.

What is claimed is:

1. A pen state detection circuit that is connected to a touch sensor of a capacitance type and adapted to detect a state of an electronic pen in accordance with an output signal from the touch sensor, the touch sensor including a plurality of sensor electrodes disposed in a planar manner, the electronic pen including a first electrode and a second electrode, the pen state detection circuit including:

a processor; and a memory storing instructions that, when executed by the processor, cause the pen state detection circuit to sequentially and repeatedly:

acquire first coordinate values and second coordinate values in a sensor coordinate system, the sensor coordinate system being defined on a detection surface of the touch sensor, the first coordinate values indicating a projected position of the first electrode, the second coordinate values indicating a projected position of the second electrode;

calculate an inclination value indicative of an inclination of the electronic pen from the acquired first coordinate values and second coordinate values in accordance with calculation rules; and output the inclination value, wherein time-series inclination values sequentially outputted when the electronic pen is positioned at a periphery or a bend of the touch sensor during movement of the electronic pen are smoothed to a greater extent than time-series inclination values sequentially outputted when the electronic pen is positioned at a central portion of the touch sensor, and wherein the time-series inclination values sequentially outputted when the electronic pen is positioned at the periphery or the bend of the touch sensor during movement of the electronic pen are smoothed by multiplying a current inclination value by a first quantity, multiplying a previous inclination value by a second quantity, and summing the current inclination value multiplied by the first quantity and the previous inclination value multiplied by second quantity.

2. The pen state detection circuit according to claim 1, wherein the second quantity is greater than zero and less than one, and wherein the first quantity is equal to one minus the second quantity.

3. The pen state detection circuit according to claim 2, wherein a value of the second quantity is greater when the electronic pen is positioned at the periphery or the bend of the touch sensor during movement of the electronic pen than when the electronic pen is positioned at the central portion of the touch sensor.

4. A pen state detection circuit that is connected to a touch sensor of a capacitance type and adapted to detect a state of an electronic pen in accordance with an output signal from the touch sensor, the touch sensor including a plurality of sensor electrodes disposed in a planar manner, the electronic pen including a first electrode and a second electrode, the pen state detection circuit including:

a processor; and a memory storing instructions that, when executed by the processor, cause the pen state detection circuit to sequentially and repeatedly:

acquire first coordinate values and second coordinate values in a sensor coordinate system, the sensor coordinate system being defined on a detection surface of the touch sensor, the first coordinate values indicating a projected position of the first electrode, the second coordinate values indicating a projected position of the second electrode;

calculate an inclination value indicative of an inclination of the electronic pen from the acquired first coordinate values and second coordinate values in accordance with calculation rules; and output the inclination value, wherein time-series inclination values sequentially outputted when the electronic pen is positioned at a periphery or a bend of the touch sensor during movement of the electronic pen are smoothed to a greater extent than time-series inclination values sequentially outputted when the electronic pen is positioned at a central portion of the touch sensor, and wherein the time-series inclination values sequentially outputted when the electronic pen is positioned at the periphery or the bend of the touch sensor during movement of the electronic pen are smoothed by multiplying a current inclination value by a first quantity, multiplying each of a plurality of previous inclination values by a second quantity, and summing the current inclination value multiplied by the first quantity and each of the previous inclination values multiplied by second quantity.

\* \* \* \* \*